US012000550B2

(12) United States Patent
Patton et al.

(10) Patent No.: US 12,000,550 B2
(45) **Date of Patent: *Jun. 4, 2024**

(54) ELECTRIC LIGHTING DEVICES

(71) Applicant: L&L Candle Company, LLC, Brea, CA (US)

(72) Inventors: Douglas Patton, Irvine, CA (US); James LaBelle, Orange, CA (US); Jeffrey Thompson, Huntington Beach, CA (US)

(73) Assignee: L&L Candle Company, LLC, Brea, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/958,749

(22) Filed: Oct. 3, 2022

(65) Prior Publication Data

US 2023/0108205 A1 Apr. 6, 2023

Related U.S. Application Data

(63) Continuation of application No. 17/234,018, filed on Apr. 19, 2021, now Pat. No. 11,460,161, which is a (Continued)

(51) Int. Cl.
*F21S 10/04* (2006.01)
*A47G 33/00* (2006.01)

(Continued)

(52) U.S. Cl.
CPC ............. *F21S 10/046* (2013.01); *F21S 6/001* (2013.01); *A47G 33/00* (2013.01); *A47G 33/08* (2013.01);

(Continued)

(58) Field of Classification Search
CPC ..................................................... Y10S 362/81
See application file for complete search history.

(56) References Cited

U.S. PATENT DOCUMENTS 2,726,320 A 12/1955 Frank
2,737,576 A 3/1956 Fasson (Continued)

FOREIGN PATENT DOCUMENTS

CA 2772728 C 2/2013
CA 2779978 C 1/2016

(Continued)

OTHER PUBLICATIONS

Zhu Wei-ming, "A Simulation Candle", Aug. 13, 2014, Image of "CN 203771082 U" merged with English translation text, image has 5 pages. (Year: 2014).*

*Primary Examiner* — Alan B Cariaso
(74) *Attorney, Agent, or Firm* — Perkins Coie LLP

(57) ABSTRACT

Various components for artificial candles and other lighting devices are described that can be used to create a realistic flame effect in the devices. The devices include a flame element that extends upwardly from a housing. A light source can be disposed with respect to the flame element such that the flame element is illuminated. A variety of drive mechanisms could be disposed within the body of the device that can cause movement of the flame element with respect to the housing. The flame element can be coupled to a housing or mounting bracket of the device using various components to suspend the flame element within the housing.

9 Claims, 16 Drawing Sheets

Related U.S. Application Data continuation of application No. 16/780,260, filed on Feb. 3, 2020, now Pat. No. 10,982,830, which is a continuation of application No. 15/696,175, filed on Sep. 5, 2017, now Pat. No. 10,557,605, which is a continuation of application No. 14/819,146, filed on Aug. 5, 2015, now Pat. No. 9,752,741.

(60) Provisional application No. 62/100,808, filed on Jan. 7, 2015, provisional application No. 62/089,089, filed on Dec. 8, 2014, provisional application No. 62/076,534, filed on Nov. 7, 2014, provisional application No. 62/063,808, filed on Oct. 14, 2014, provisional application No. 62/046,113, filed on Sep. 4, 2014, provisional application No. 62/041,595, filed on Aug. 25, 2014, provisional application No. 62/033,307, filed on Aug. 5, 2014, provisional application No. 62/033,294, filed on Aug. 5, 2014.

(51) Int. Cl.

| | |
|---|---|
| ***A47G 33/08*** | (2006.01) |
| ***F21S 6/00*** | (2006.01) |
| ***F21W 121/00*** | (2006.01) |
| ***F21Y 115/10*** | (2016.01) |

(52) U.S. Cl.
CPC ...... *F21W 2121/00* (2013.01); *F21Y 2115/10* (2016.08); *Y10S 362/81* (2013.01)

(56) References Cited

U.S. PATENT DOCUMENTS

| | | | | |
|---|---|---|---|---|
| 4,328,534 | A | 5/1982 | Abe | |
| 5,012,397 | A | 4/1991 | Tseng | |
| 5,174,645 | A | 12/1992 | Chung | |
| 5,280,682 | A | 1/1994 | Fussell | |
| 7,159,994 | B2 | 1/2007 | Schnuckle et al. | |
| 7,261,455 | B2 | 8/2007 | Schnuckle et al. | |
| 7,350,720 | B2 | 4/2008 | Jaworski et al. | |
| 7,481,571 | B2 | 1/2009 | Bistritzky et al. | |
| 7,503,668 | B2 | 3/2009 | Porchia et al. | |
| 7,824,627 | B2 | 11/2010 | Michaels et al. | |
| 7,837,355 | B2 | 11/2010 | Schnuckle | |
| 8,007,132 | B2 | 8/2011 | Huang | |
| 8,070,319 | B2 * | 12/2011 | Schnuckle | H01K 7/06 362/249.02 |
| 8,132,936 | B2 | 3/2012 | Patton et al. | |
| 8,311,140 | B2 | 11/2012 | Feher | |
| 8,342,712 | B2 | 1/2013 | Patton et al. | |
| 8,534,869 | B2 | 9/2013 | Patton et al. | |
| 8,550,660 | B2 | 10/2013 | Patton et al. | |
| 8,646,946 | B2 | 2/2014 | Schnuckle et al. | |
| 8,696,166 | B2 | 4/2014 | Patton et al. | |
| 8,721,118 | B2 | 5/2014 | Patton et al. | |
| 8,727,569 | B2 | 5/2014 | Schnuckle et al. | |
| 8,733,986 | B2 | 5/2014 | Hau et al. | |
| 8,777,465 | B2 | 7/2014 | Patton et al. | |
| 8,789,986 | B2 | 7/2014 | Li | |
| 8,882,314 | B1 | 11/2014 | Chen | |
| 8,926,137 | B2 | 1/2015 | Li | |
| 9,052,078 | B2 | 6/2015 | Sheng | |
| 9,133,992 | B2 | 9/2015 | Lee | |
| 9,146,010 | B2 | 9/2015 | Santiago | |
| 9,335,014 | B2 | 5/2016 | Patton et al. | |
| 9,388,954 | B2 | 7/2016 | Lai | |
| 9,523,470 | B2 | 12/2016 | Lai | |
| 9,528,670 | B2 | 12/2016 | Wu | |
| 9,752,741 | B2 | 9/2017 | Patton et al. | |
| 10,557,605 | B2 | 2/2020 | Patton et al. | |
| 10,982,830 | B2 | 4/2021 | Patton et al. | |
| 2004/0085765 | A1 | 5/2004 | Hermanson et al. | |
| 2005/0169666 | A1 | 8/2005 | Porchia et al. | |
| 2005/0285538 | A1 | 12/2005 | Jaworski et al. | |
| 2006/0034100 | A1 * | 2/2006 | Schnuckle | F21V 13/14 362/362 |
| 2006/0039835 | A1 | 2/2006 | Nottingham et al. | |
| 2006/0125420 | A1 | 6/2006 | Boone et al. | |
| 2006/0146544 | A1 | 7/2006 | Leung | |
| 2006/0213097 | A1 | 9/2006 | Haugom | |
| 2007/0127249 | A1 | 6/2007 | Medley et al. | |
| 2008/0031784 | A1 | 2/2008 | Bistritzky et al. | |
| 2008/0038156 | A1 | 2/2008 | Jaramillo | |
| 2008/0130266 | A1 | 6/2008 | Dewitt et al. | |
| 2008/0150453 | A1 | 6/2008 | Medley et al. | |
| 2011/0019422 | A1 * | 1/2011 | Schnuckle | F21S 10/04 362/277 |
| 2011/0027124 | A1 | 2/2011 | Albee et al. | |
| 2011/0127914 | A1 | 6/2011 | Patton et al. | |
| 2011/0134628 | A1 * | 6/2011 | Pestl | F21V 33/004 29/592.1 |
| 2012/0020052 | A1 | 1/2012 | Mccavit et al. | |
| 2012/0024837 | A1 | 2/2012 | Thompson | |
| 2012/0093491 | A1 | 4/2012 | Browder et al. | |
| 2012/0300459 | A1 | 11/2012 | Hau et al. | |
| 2013/0050985 | A1 | 2/2013 | Kwok et al. | |
| 2014/0104812 | A1 | 4/2014 | Patton et al. | |
| 2014/0177212 | A1 | 6/2014 | Li | |
| 2014/0211499 | A1 * | 7/2014 | Fong | H05B 45/00 362/558 |
| 2014/0218903 | A1 * | 8/2014 | Sheng | F21S 10/046 362/190 |
| 2014/0241004 | A1 | 8/2014 | Chen | |
| 2015/0036348 | A1 * | 2/2015 | Dong | F21V 23/002 362/372 |
| 2015/0055331 | A1 | 2/2015 | Lai | |
| 2015/0109786 | A1 | 4/2015 | Li | |
| 2015/0233538 | A1 | 8/2015 | Sheng | |
| 2015/0308643 | A1 | 10/2015 | Huang | |
| 2015/0362141 | A1 | 12/2015 | Chen | |
| 2020/0208798 | A1 | 7/2020 | Patton et al. | |
| 2021/0341119 | A1 | 11/2021 | Patton et al. | |

FOREIGN PATENT DOCUMENTS

| | | | | |
|---|---|---|---|---|
| CA | 2886665 | C | | 8/2016 |
| CN | 101865413 | A | | 10/2010 |
| CN | 201724143 | U | | 1/2011 |
| CN | 102147095 | A | | 8/2011 |
| CN | 202032445 | U | | 11/2011 |
| CN | 102352966 | A | | 2/2012 |
| CN | 202188437 | U | | 4/2012 |
| CN | 202215951 | U | | 5/2012 |
| CN | 102563510 | A | | 7/2012 |
| CN | 101918755 | B | | 8/2012 |
| CN | 102734740 | A | | 10/2012 |
| CN | 102748589 | A | | 10/2012 |
| CN | 202647570 | U | | 1/2013 |
| CN | 202708605 | U | | 1/2013 |
| CN | 202708961 | U | | 1/2013 |
| CN | 202747231 | U | | 2/2013 |
| CN | 103047604 | A | | 4/2013 |
| CN | 103196094 | A | | 7/2013 |
| CN | 203115826 | U | | 8/2013 |
| CN | 203273669 | U | | 11/2013 |
| CN | 103471028 | A | | 12/2013 |
| CN | 203375334 | U | | 1/2014 |
| CN | 103574486 | A | | 2/2014 |
| CN | 203442498 | U | | 2/2014 |
| CN | 203571616 | U | | 4/2014 |
| CN | 102721002 | B | | 6/2014 |
| CN | 203771082 | U | * | 8/2014 |
| DE | 202011109285.6 | U1 | | 2/2012 |
| DE | 202014100821.7 | U1 | | 3/2014 |
| DE | 202014003246.7 | U1 | | 4/2014 |
| DE | 202014102379.8 | U1 | | 6/2014 |
| EP | 0138786 | A1 | | 4/1985 |
| EP | 2232128 | B1 | | 2/2013 |
| EP | 2565518 | A1 | | 3/2013 |
| EP | 2587127 | A1 | | 5/2013 |
| EP | 2172690 | B1 | | 9/2013 |
| EP | 2644970 | A1 | | 10/2013 |

(56) References Cited

FOREIGN PATENT DOCUMENTS

| | | | | | |
|---|---|---|---|---|---|
| EP | 2546571 | B1 | | 10/2016 | |
| GB | 2379731 | A | * | 3/2003 | ............ F21S 10/046 |
| JP | 3183216 | U | | 5/2013 | |
| KR | 101174246 | B1 | | 8/2012 | |
| WO | 87/04506 | A1 | | 7/1987 | |
| WO | 96/25624 | A1 | | 8/1996 | |
| WO | 01/92780 | A1 | | 12/2001 | |
| WO | 2006020839 | A2 | | 2/2006 | |
| WO | 2012162538 | A1 | | 11/2012 | |
| WO | 2014036968 | A1 | | 3/2014 | |
| WO | 2015021066 | A2 | | 2/2015 | |
| WO | 2015/080664 | A1 | | 6/2015 | |
| WO | 2015/139399 | A1 | | 9/2015 | |

* cited by examiner

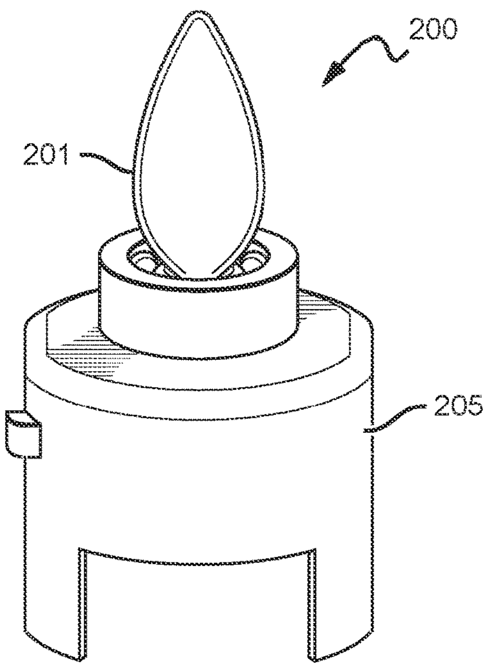
FIG. 2A
FIG. 2B
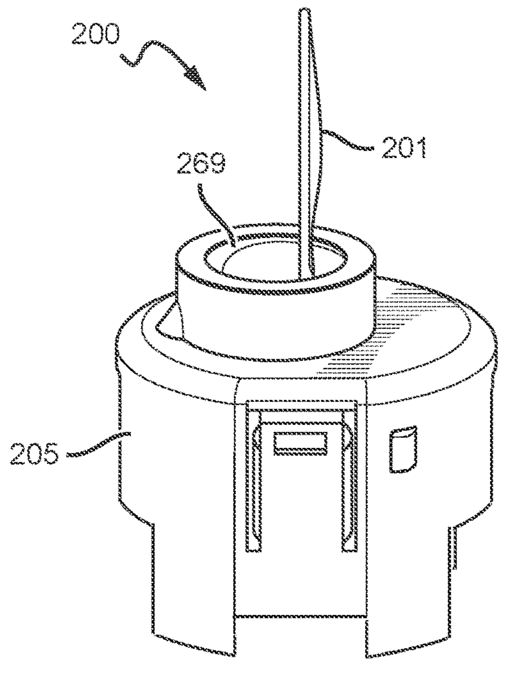
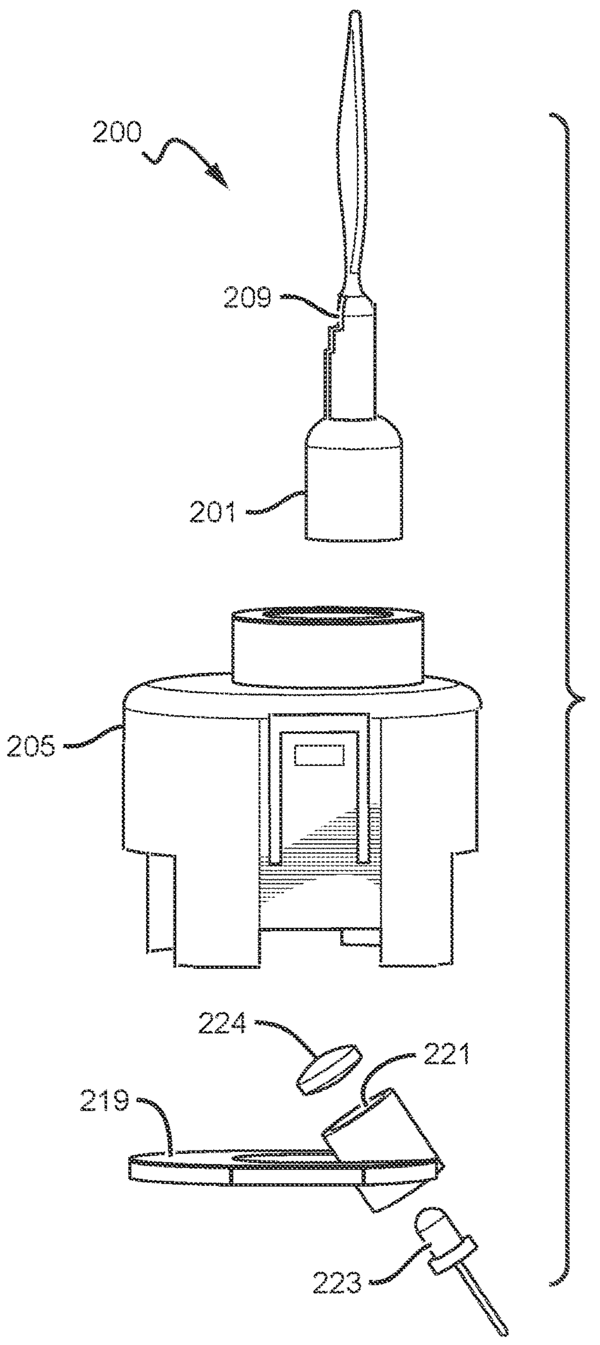
FIG. 2C

FIG. 2D
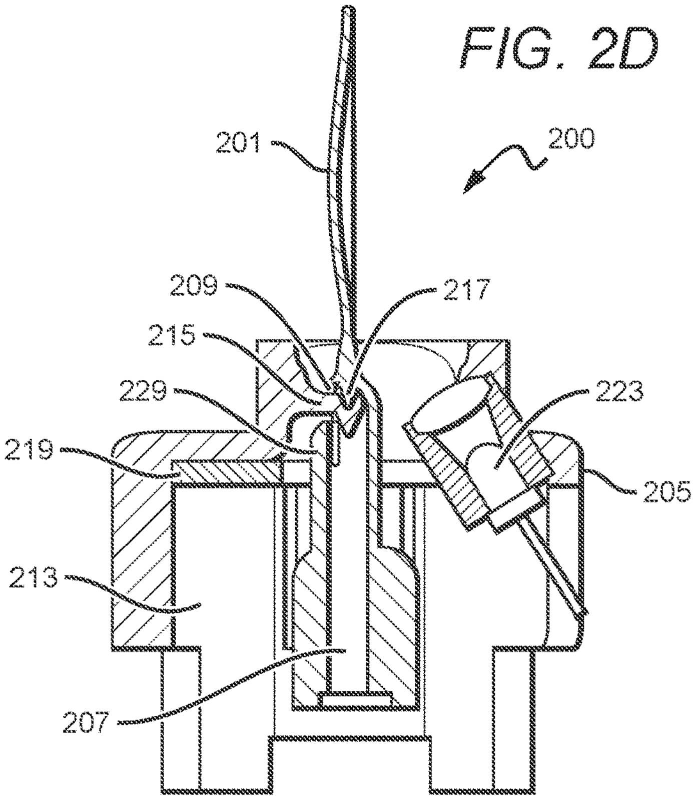
FIG. 3A
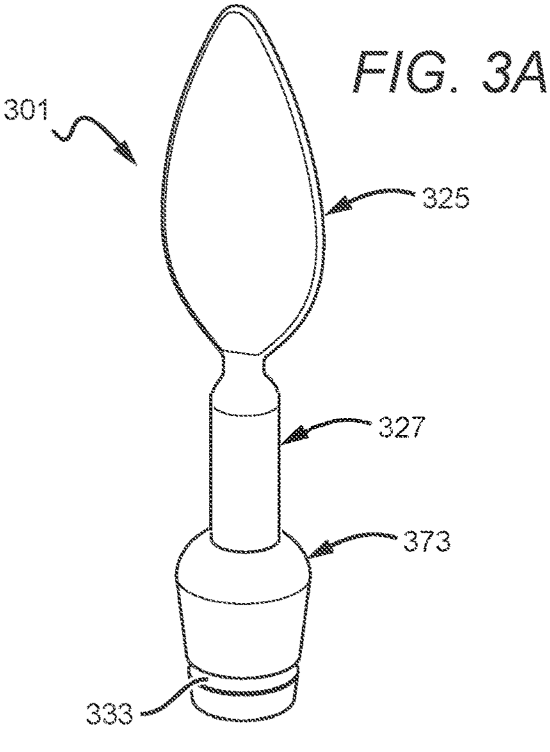
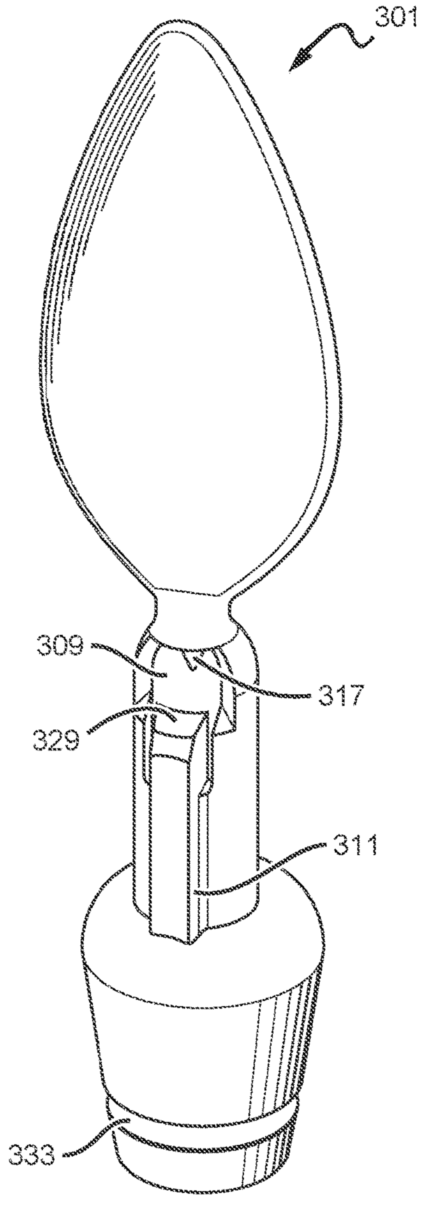
FIG. 3B

FIG. 3C
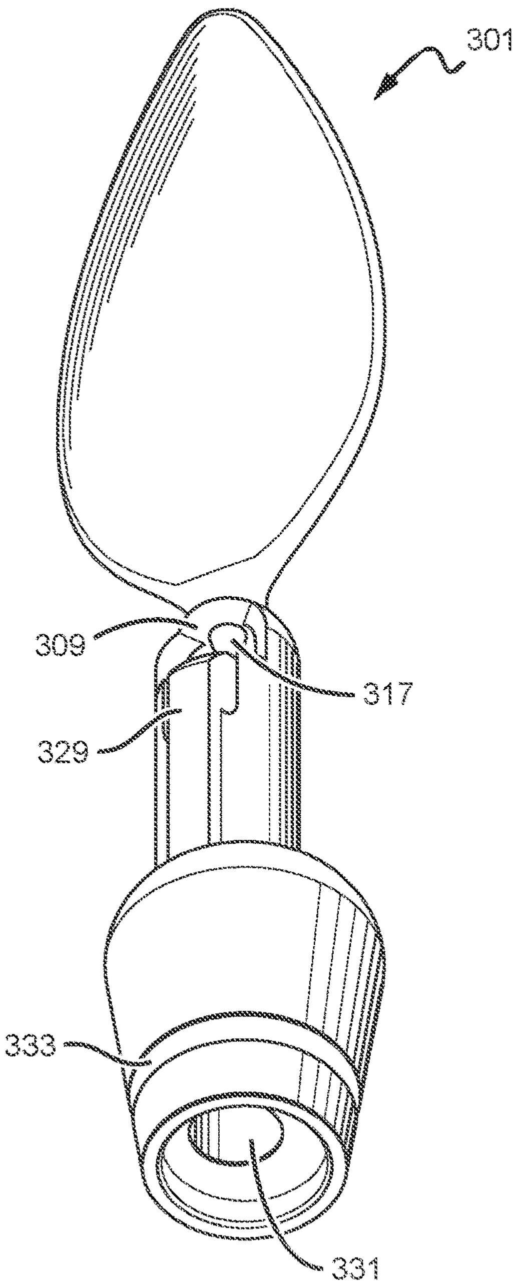
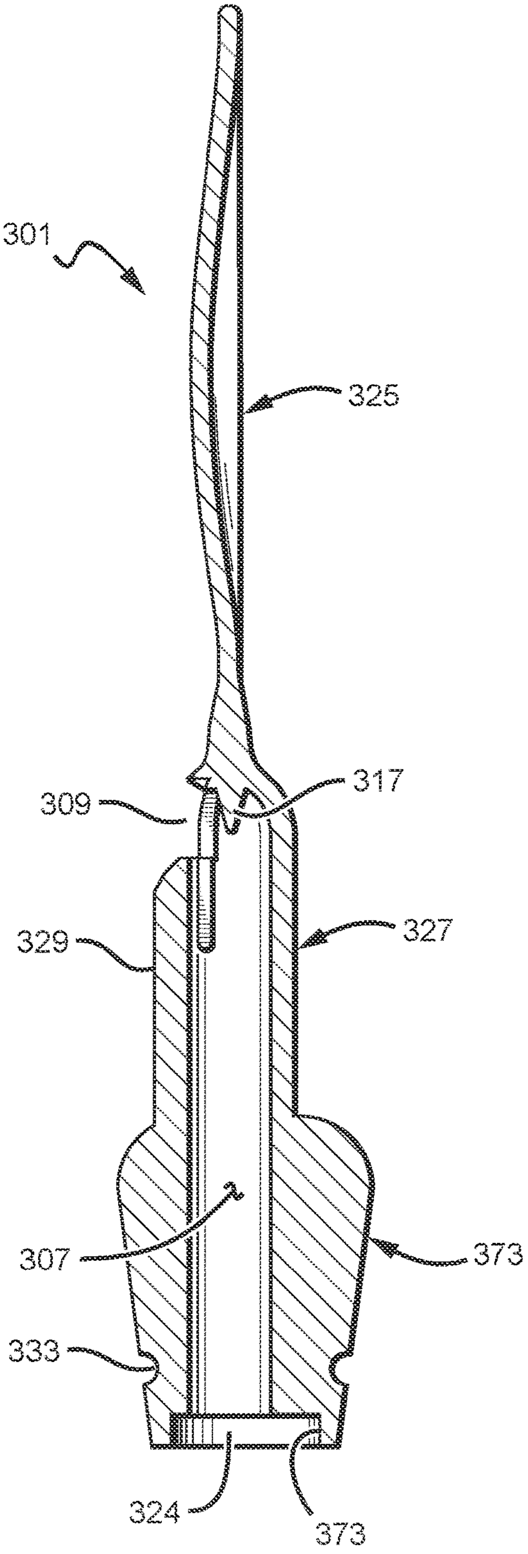
FIG. 3D

FIG. 7A
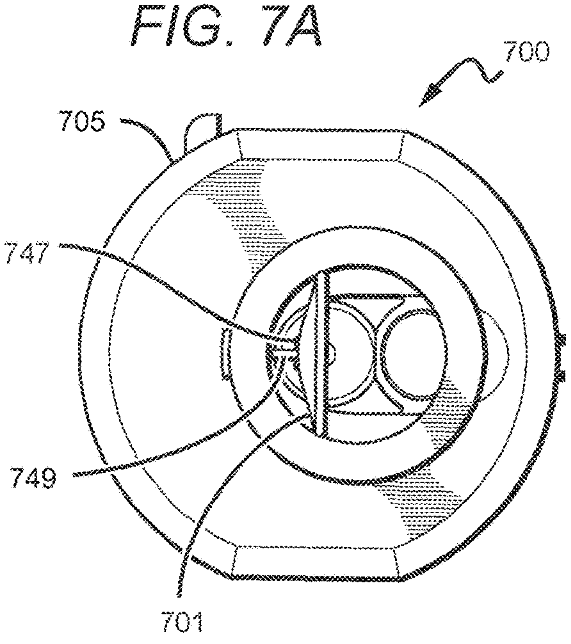
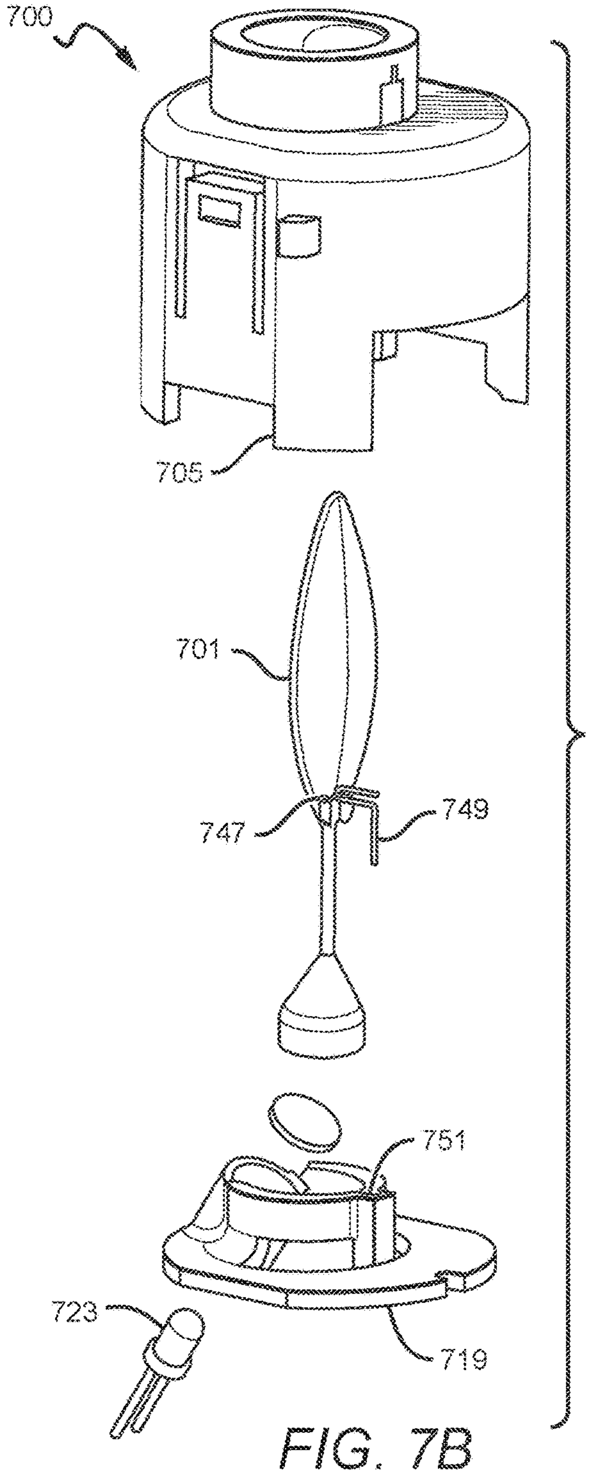
FIG. 7B
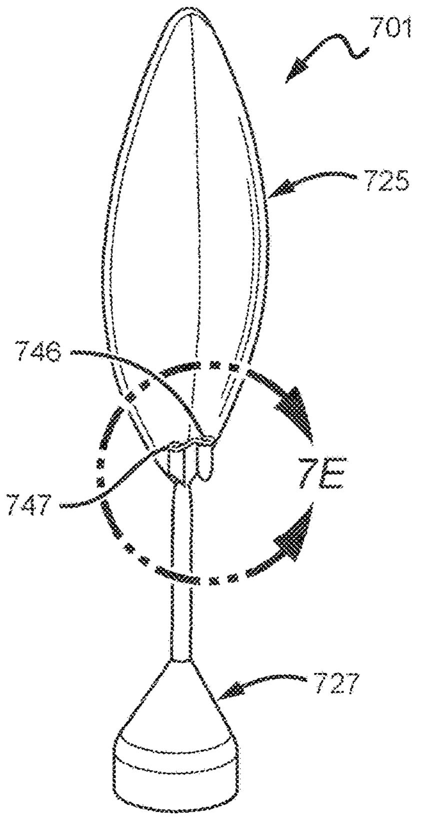
FIG. 7C

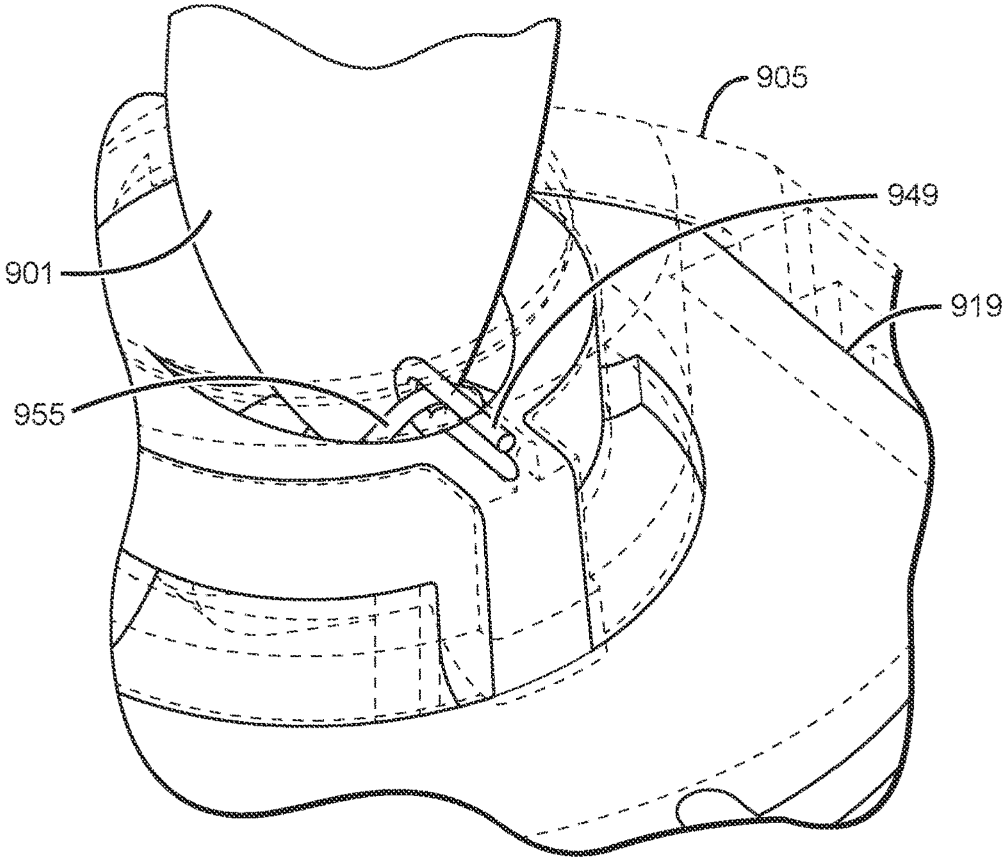
FIG. 9B
FIG. 9C
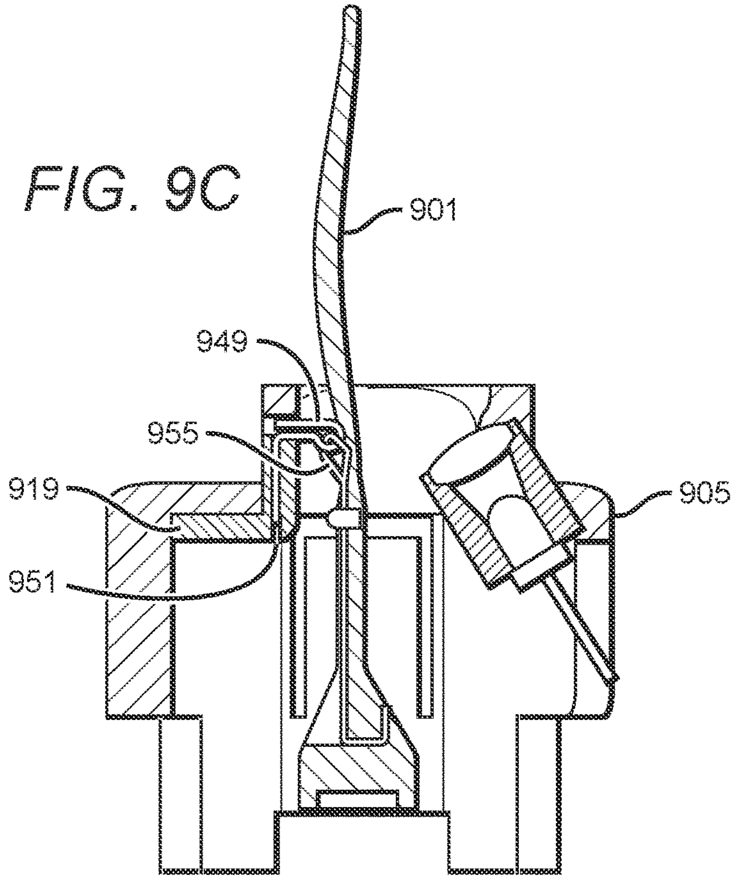

ELECTRIC LIGHTING DEVICES

This application is a continuation of U.S. application Ser. No. 17/234,018, filed Apr. 19, 2021, which is a continuation of U.S. application Ser. No. 16/780,260, filed Feb. 3, 2020, now U.S. Pat. No. 10,982,830, which is a continuation of U.S. application Ser. No. 15/696,175, filed Sep. 5, 2017, now U.S. Pat. No. 10,557,605, which is a continuation of U.S. application Ser. No. 14/819,146 filed Aug. 5, 2015, now U.S. Pat. No. 9,752,741, which claims priority to U.S. Provisional Application Ser. No. 62/100,808, filed Jan. 7, 2015, U.S. Provisional Application Ser. No. 62/089,089, filed Dec. 8, 2014, U.S. Provisional Application Ser. No. 62/076,534, filed Nov. 7, 2014, U.S. Provisional Application Ser. No. 62/063,808, filed Oct. 14, 2014, U.S. Provisional Application Ser. No. 62/046,113, filed Sep. 4, 2014, U.S. Provisional Application Ser. No. 62/041,595, filed Aug. 25, 2014, U.S. Provisional Application Ser. No. 62/033,307, filed Aug. 5, 2014 and U.S. Provisional Application Ser. No. 62/033,294, filed Aug. 5, 2014. All extrinsic materials identified herein are incorporated by reference in their entirety.

FIELD OF THE INVENTION

The field of the invention is electronic lighting devices, and in particular, electric candles.

BACKGROUND

The background description includes information that may be useful in understanding the present invention. It is not an admission that any of the information provided herein is prior art or relevant to the presently claimed invention, or that any publication specifically or implicitly referenced is prior art.

Various electric lights are known in the art. See, e.g., U.S. Pat. No. 8,132,936 to Patton et al., U.S. Pat. No. 8,070,319 to Schnuckle et al., U.S. Pat. No. 7,837,355 to Schnuckle et al., U.S. Pat. No. 7,261,455 to Schnuckle et al., U.S. Pat. No. 7,159,994 to Schnuckle et al., US 2011/0127914 to Patton et al., U.S. Pat. No. 7,350,720 to Jaworski et al.; US 2005/0285538 to Jaworski et al. (publ. December 2005); U.S. Pat. No. 7,481,571 to Bistritzky et al.; US 2008/0031784 to Bistritzky et al. (publ. February 2008); US 2006/0125420 to Boone et al. (publ. June 2006); US 2007/0127249 to Medley et al. (publ. June 2007); US 2008/0150453 to Medley et al. (publ. June 2008); US 2005/0169666 to Porchia, et al. (publ. August 2005); U.S. Pat. No. 7,503,668 to Porchia, et al.; U.S. Pat. No. 7,824,627 to Michaels, et al.; US 2006/0039835 to Nottingham et al. (publ. February 2006); US 2008/0038156 to Jaramillo (publ. February 2008); US 2008/0130266 to DeWitt et al. (publ. June 2008); US 2012/0024837 to Thompson (publ. February 2012); US 2011/0134628 to Pestl et al. (publ. June 2011); US 2011/0027124 to Albee et al. (publ. February 2011); US 2012/0020052 to McCavit et al. (publ. January 2012); US 2012/0093491 to Browder et al. (publ. April 2012); and US 2014/0218903 to Sheng.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

However, there is still a need in the art for improved electric candles and other lighting devices.

SUMMARY OF THE INVENTION

The present invention provides apparatus, systems, and methods in which an electronic lighting device (e.g., an artificial candle) comprises components that provide numerous configurations of electronic lighting devices while at the same time maintaining a simulation of a real candle flame.

In one aspect, an electronic lighting device comprises a flame element and a housing. The flame element has an aperture disposed on a sidewall and a hollow interior. The housing comprises an internal cavity and an arm that extends horizontally into the cavity. The arm of the housing is sized and dimensioned to extend through the aperture to suspend the flame element within the cavity, such that the flame element is allowed to move with respect to the housing. It is preferred that the flame element has a projection that extends downward into a recess of the arm to allow movement of the flame element while the projection rests within the recess. It should be appreciated that this movement is at least one factor that allows the flame element to simulate the movement of a real candle flame.

While it is contemplated that the flame element moves while it is suspended on the arm, the flame element is typically secured to prevent unintentionally or undesired removal of the flame element from the arm and thereby reduce the risk of the flame element from falling or separating from the arm. For example, the flame element can comprise an upward or downward tab that is defined by a sidewall and forms part of the aperture, and the arm of the housing can have a downward or upward projection, respectively, such that the tab and the projection of the arm overlap to secure the flame element on the arm while the flame element is suspended on the arm. In other words, at least one of the tab and projection of the arm has a length that extends over and partly covers the length of the other, such that the flame element snaps on to the arm of the housing. Thus, it is contemplated that the tab is a flexible material. While flame element is secured to the arm, it should be appreciated that flame element can be removed and replaced in the electronic lighting device. In other contemplated embodiments, the arm can be removably coupled to the housing, such that the flame element can be suspended on to the arm, and then the arm can be coupled to the housing to suspend the flame element from the arm and within the housing.

Additionally, or alternatively, a pin can be used to secure the flame element to the housing. It is contemplated that the pin is sized and dimensioned to extend through a second aperture of the flame element and into the hollow interior to secure the flame element on the arm. The pin can have a recess that is configured to receive a downward projection of the arm to secure the flame element on the arm. The size of the pin can vary to secure the flame element. For example, the pin can have a first diameter and the hollow interior has a second diameter, wherein the first diameter and the second diameter are preferably within 10% of each other.

As mentioned above, the flame element can have a downward projection that rests within a recess of the arm to suspend the flame element. However, it is also contemplated that a concave apex defines an upper portion of the hollow interior of the flame element. In such embodiment, the arm can have an upward projection, such that the concave apex rests on the upward projection to allow movement of the flame element while the flame element is suspended on the arm. It should be appreciated that flame element can have a tab to further secure the flame element to the arm as discussed above.

In another aspect, an electronic lighting device comprises a flame element and a housing. The flame element has a first aperture disposed on a sidewall and a second aperture on a bottom surface of the flame element. The housing comprises an internal cavity and an arm that extends horizontally into the cavity. The arm is sized and dimensioned to extend through the first aperture to suspend the flame element within the cavity so as to allow movement of the flame element with respect to the housing. For example, the flame element can have a projection that extends downward to rest within a recess of the arm so as to allow movement of the flame element while the flame element is suspended.

Similar to the aspect described above, it is contemplated that at least one of a pin and a tab can be used to secure the flame element onto the arm while the flame element is suspended. For example, the pin can be sized and dimensioned to extend through the second aperture and into a hollow interior of the flame element to secure the flame element on the arm. The pin can have a first diameter and the hollow interior can have a second diameter, such that the first diameter and the second diameter are preferably within 10% of one another.

The flame element preferably comprises a hollow interior and an aperture disposed on one sidewall of the flame element. An arm extends horizontally from the housing into an internal cavity and through the aperture of the flame element and into the flame element's cavity. The arm preferably has a recessed area and the flame element has a projection that extends downward into the hollow interior. The projection of the flame element rests within the recessed area so as to allow movement of the flame element in two or more dimensions while the projection rests within the recessed area.

In another aspect, the flame element can include a clip that is disposed on or is adjacent to a flame-shaped portion, which is configured to couple the flame element to a mounting rod. The mounting rod is sized and dimensioned to engage the clip to allow movement of the flame element with respect to the housing while the flame element is coupled to the mounting rod. It should be appreciated that allowing the flame element to move while it is coupled to the housing is at least one factor that allows the flame element to simulate the movement of a real candle flame.

In another aspect, an electronic lighting device comprises a flame element, a mounting bracket and a support wire. The flame element comprises a flame-shaped portion and a body portion. The flame-shaped portion has a face and the body portion comprises an aperture that extends through the body portion in a direction substantially parallel to the face, wherein substantially is within 15 degrees, and more typically within 5 degrees of parallel. In other words, the aperture does not extend in a direction into the face, but in a direction that extends across the length of the face. As used herein, "face" means the major surface of flame-shaped portion of the flame element.

The mounting bracket is configured to receive a support wire that extends inwardly through the aperture to suspend the flame element within the mounting bracket. The support wire can be supported by the mounting bracket in a number of suitable ways. For example, the mounting bracket can have a slit that is sized and dimensioned to receive the support wire. In another example, the support wire can be coupled to the mounting bracket by a fastener.

It should be appreciated that the flame element is suspended in a manner that allows movement, such that the flame element can simulate the movement of a real candle light. It is contemplated that the flame-shaped portion has a first weight and the body portion has a second weight, and the second weight is greater than the first weight. Thus, the center of mass of the flame element can be below the aperture, such that the flame element remains upright. Additionally, or alternatively, the body portion comprises an elongated portion and a base portion, wherein the elongated portion has a smaller cross-sectional area than the base portion.

The flame element is typically suspended so that the flame-shaped portion extends above the mounting bracket. Additionally, a housing with a top opening can be removably coupled to the mounting bracket. In such embodiment, it is contemplated that the support wire is positioned below the top opening, and that at least part of the flame element extends above the top opening. Thus, it should be appreciated that the visibility of the support wire is reduced.

The electronic lighting device can further comprise a light source. The light source can rest within a groove on the mounting bracket. It is contemplated that the support wire and the light source are positioned so that the support wire does not block light emitted from the light source. Thus, the support wire can be positioned in the mounting bracket so that no shadow is created on the flame element from the light emitted from the light source.

One should appreciate that the disclosed subject matter provides many advantageous technical effects including providing various designs of an artificial candle that simulate a real candle light. Thus, many drawbacks of conventional methods of providing an artificial candle can be reduced, and even possibly eliminated, by the disclosed subject matter.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 2A and 2B are a front view and side view, respectively, of another embodiment of an electronic lighting device.

FIG. 2C is an exploded view of the electronic lighting device in FIG. 2A.

FIG. 2D is a cross-sectional view of the electronic lighting device in FIG. 2A.

FIG. 3A is a front perspective view of an embodiment of a flame element.

FIG. 3B is a back perspective view of the flame element in FIG. 3A.

FIG. 3C is a bottom perspective view of the flame element in FIG. 3A.

FIG. 3D is a cross-sectional view of the flame element in FIG. 3A.

FIG. 7A is a top view of an embodiment of an electronic lighting device having a flame element with a wire clip.

FIG. 7B is an exploded view of the electronic lighting device in FIG. 7A.

FIGS. 7C and 7D are a perspective view and a side view, respectively, of the flame element in the electronic lighting device in FIG. 7A.

FIG. 9B is an enlarged view of the mounting rod coupled to the clip in the electronic lighting device in FIG. 9A.

FIG. 9C is a cross-sectional view of the electronic lighting device in FIG. 9A.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventor has discovered that electronic lighting devices can be produced using various designs without reducing the ability to simulate a real candle light. Specifically, the flame element can be suspended using a variety of means without sacrificing the ability to mimic a real candle light. For example, the flame element can be mounted on an arm of the housing. In another example, the flame element can have a clip configured to couple with a mounting rod. Indeed, it should be appreciated that the support structures for suspending flame element are hidden, such that they are not readily visible to users and do not cast a shadow on the flame element by light emitted from a light source of the electronic lighting device. Thus, various electronic lighting devices are disclosed that mimic a real candle light.

In FIGS. 1A-1D, an electronic lighting device 100 comprises a flame element 101 and an outer shell 103. Flame element 101 is partially housed within outer shell 103, such that flame element 101 is allowed to move in a manner that simulates a moving flame. For example, a circuit board can control a drive mechanism, which could be an electromagnet, a fan, or other component that creates kinetic motion on flame element 101 to simulate the movement of a moving flame. A detailed description of an exemplary internal configuration for an electronic lighting device that is configured to move a flame element can be found in co-pending PCT application PCT/US15/11642, which is hereby incorporated by reference.

Figure 1A:
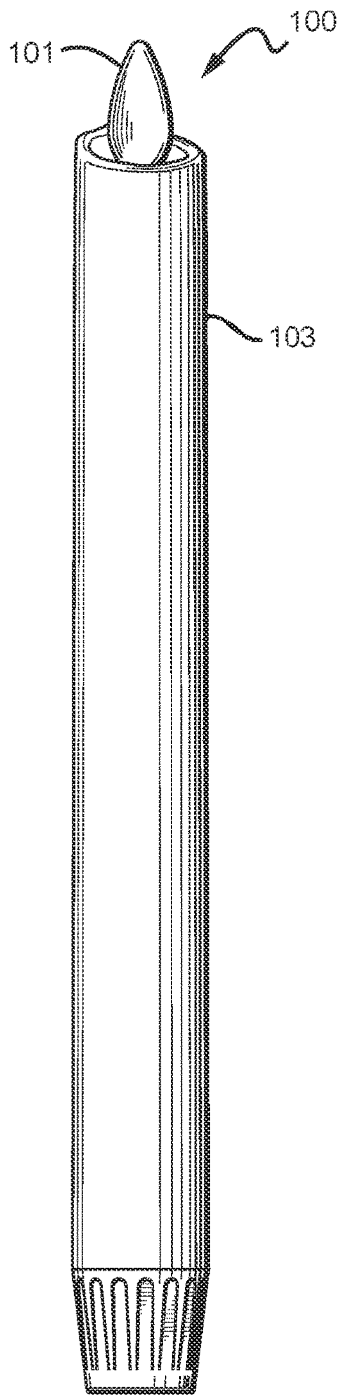
FIGS. 1A and 1B are a front view and back view, respectively, of an embodiment of an electronic lighting device.
Figure 1B:
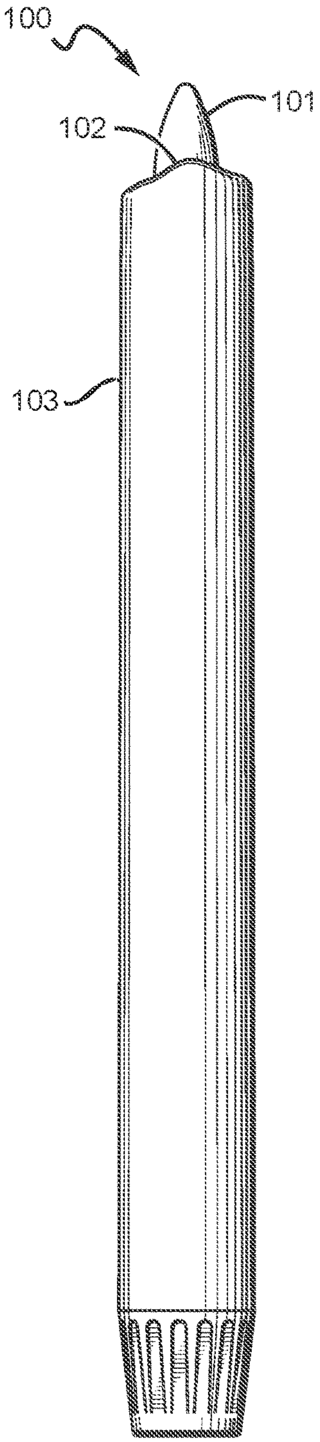
Figure 1C:
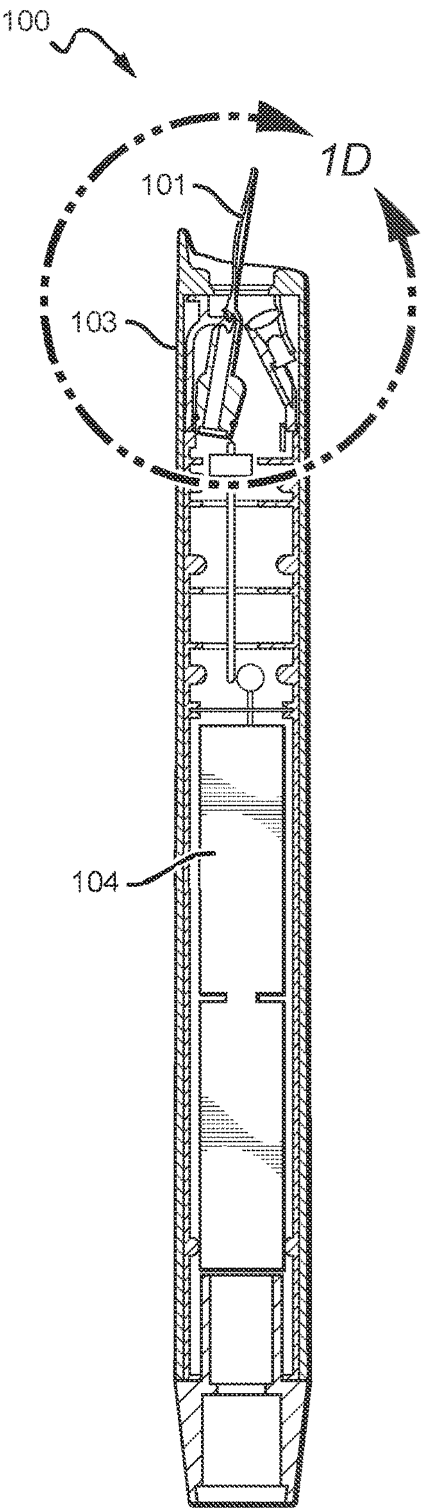
FIG. 1C is a cross-sectional view of the electronic lighting device in FIG. 1A.

Outer shell 103 can have a scented or unscented wax coating and an uneven top ridge 102, as shown in FIG. 1B, to match the appearance of a real candle. It is contemplated that there are various components housed within outer shell 103 that cooperate to operate electronic lighting device 100. For example, FIG. 1C shows a cross-sectional view of electronic lighting device 100 where a circuit board 104 and flame element 101 is at least partially disposed within outer shell 103. Another contemplated part disposed within outer shell 103 is a light controlling material, such as an opaque layer, which reduces or prevents light from bleeding through all or a portion of the outer shell 103. For example, a opaque inner material can surround an interior perimeter of the outer shell 103, such that light from a light source within electronic lighting device 100 is not seen through outer shell 103. In another example, electronic lighting device 100 can comprise a thin layer, typically plastic, adjacent to outer shell 103 to prevent light from a light source within electronic lighting device 100 to be seen through outer shell 103. While the thin layer can be disposed throughout all the areas within outer shell 103, it is contemplated that the thin layer can be disposed on at least one of a portion (top, center, bottom) of electronic lighting device 100. The thin layer can also be disposed around the perimeter of a light source within electronic lighting device 100 to reduce light from being emitted through the sides of the light source. In such embodiments, it is contemplated that an opaque tape or other material could be wrapped about a portion of the light source to prevent light from emanating in certain directions.

In yet another example, electronic lighting device 100 can include an opaque interior chassis in at least a portion of electronic lighting device 100. It should be appreciated that these light controlling materials will enhance the simulation of electronic lighting device 100 to mimic a real candle by limiting light emitted from electronic lighting device 100 to the top as seen in various real candles.

Figure 1D:
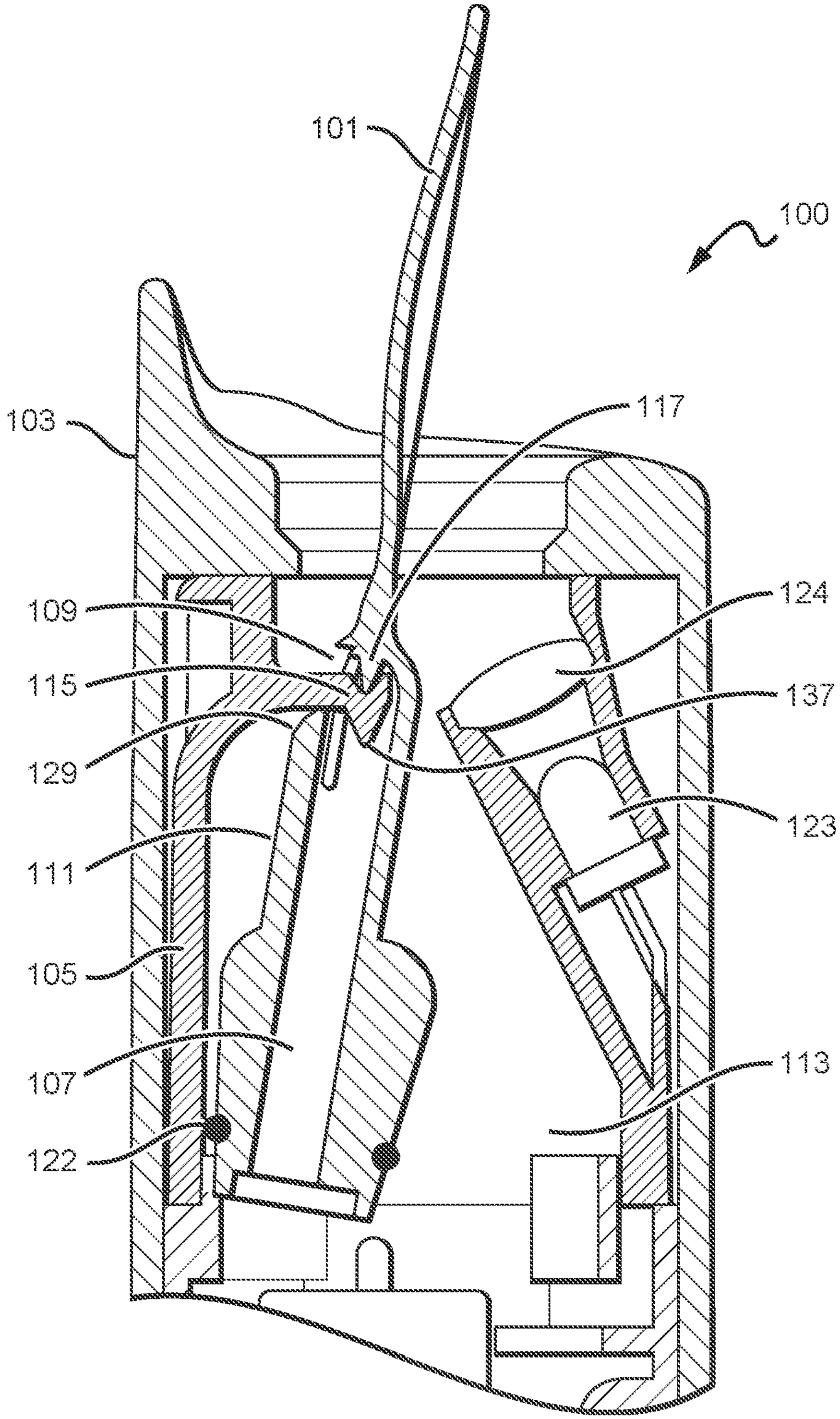
FIG. 1D is an enlarged view of the upper region of the cross-sectional view in FIG. 1C.

FIG. 1D shows an enlarged view of the upper region of electronic lighting device 100. Electronic lighting device 100 comprises flame element 101 and housing 105. Flame element 101 has a hollow interior 107 and an aperture 109 disposed on a side 111 of flame element 101. Housing 105 has an internal cavity 113 and an arm 115 that extends horizontally into internal cavity 113. It should be appreciated that internal cavity 113 is sized and dimensioned to receive a portion of flame element 101. Arm 115 is sized and dimensioned to extend through aperture 109 of flame element 101 to suspend the flame element within internal cavity 113 so as to allow movement of flame element 101 with respect to housing 105. Typically, arm 115 integral with housing 105 (i.e., they are formed by a single, injection-molded piece), but arm 115 can also be a separate component. For example, arm 115 can be removably coupled to housing 105 by a variety of coupling techniques (e.g., snap-fit, pressure-fit, lock-fit, rotational lock-fitting, rotational snap-fitting, using fasteners such as screws, nuts, bolts, and/or washers), or it can be secured by another piece or pieces dedicated to hold arm 115 in housing 105. It should be appreciated that having arm 115 as a separate component of housing 105 allows a user to insert arm 115 through aperture 109 to suspend flame element 101 before suspending flame element 101 in housing 105. Once arm 115 is within aperture 109 of flame element 101, arm 115 can be coupled to housing 105 to suspend flame element 101 within internal cavity 113 of housing 105. In an exemplary embodiment, the arm 115 can slide within a recessed portion of the housing 105, and then extend generally horizontally within the housing 105 to thereby suspend the flame element 101.

It is contemplated that a projection 117 of flame element 101 rests within a recessed area of arm 115 to suspend flame element 101. Additionally, or alternatively, it is contemplated that a tab 129 disposed on a side 111 of flame element 101 reduces the risk of flame element 101 falling or separating from arm 115. This reduction in risk is at least due to tab 129 and a downward projection 137 of arm 115 overlapping, such that the height of aperture 109 is less than a height of arm 115 as measured from the top surface of arm 115 to the apex of projection 137. Thus, it is contemplated that tab 129 can be required to move to allow insertion of removal of flame element 101 from arm 115.

Electronic lighting device 100 can further comprise a light source 123 and a lens 124. Light source 123 can be an LED or another light source sufficient to emit light onto flame element 101. Lens 124 can be used can be used to focus light emitted from light source 123. It is contemplated that a light controlling material (e.g., tape or other thin layer or other commercially suitable material) can be disposed on at least one an inner surface of housing 105, an outer surface of housing 105, and the perimeter of the housing for light source 123 and lens 124. Such light controlling material can prevent light from bleeding through the sides of the housing, which can reduce the ability of electronic lighting device 100 to mimic a real candle.

Flame element 101 can further include an O-ring 122 that is disposed in a channel near the bottom surface of flame element 101. It is contemplated that O-ring 122 is used to reduce the noise generated when flame element 101 bumps into housing 105 while flame element 101 is moving to simulate a moving flame. While O-ring 122 is disposed near the bottom of flame element 101, it is contemplated that O-ring 122 can be disposed in other areas of flame element 101 or that more than one O-ring 122 is disposed on flame element 101 so long as it is suitable to reduce the noise generated when flame element 101 bumps housing 105.

FIG. 2A shows electronic lighting device 200 comprising a flame element 201 and a housing 205. Similar to the electronic lighting device of FIGS. 1A-1D, flame element 201 is suspended so as to allow it to move in a manner that simulates a real candle light. FIG. 2B shows a side view of electronic lighting device 200. Housing 205 has an upper region with a top opening 269 that has a smaller circumference than a bottom region that has a bottom opening with a larger circumference. As shown in FIG. 2B, flame element 201 is suspended to extend through top opening 269 near one end (e.g., front end or back end) of top opening 269. In other words, flame element 201 is not suspended to extend through the center of top opening 269. However, in other contemplated embodiments, flame element 201 is suspended to extend through the center of top opening 269.

It is contemplated that housing 205 can be manufactured as a single piece via injection molding. By creating housing 205 as a single piece, the overall complexity of the device is significantly reduced. By forming housing 205 as a single piece, the number of parts is reduced, simplifying assembly (e.g., by robotic or human assembly lines).

Electronic lighting device 200 further includes a mounting bracket 219 as shown in FIG. 2C. Mounting bracket 219 comprises a groove 221 that can be used to hold a light source 223. It should be appreciated that groove 221 extends at an angle so that light source 223 can emit light onto flame element 201 to simulate a real light candle. Furthermore, it is contemplated that a light controlling material can be disposed on at least one of an internal surface of groove 221, an internal surface of housing 205, and an external surface of housing 205.

Light source 223 can project different colors of light, though preferably it projects a color that is similar to the color of a candle flame (e.g., orange, yellow, red, blue, or some combination thereof). A lens 224 is used to focus the light to a desired degree. For example, a focal length greater than the distance between the lens 224 and the flame element 201 can provide softer lighting than if the light were focused directly onto the flame element. Alternatively, the focal length can be shorter than the distance between the lens 224 and the flame element 201 to achieve substantially the same effect since with a simple lighting device (e.g., an LED) the orientation of the image is irrelevant.

Mounting bracket 219 is inserted upwardly through the bottom opening of housing 205. It is contemplated that mounting bracket 219 can be coupled to housing 205 by a variety of coupling techniques (e.g., glue, epoxy, snap-fit, pressure-fit, lock-fit, rotational lock-fitting, rotational snap-fitting, using fasteners such as screws, nuts, bolts, and/or washers), or it can be secured by another piece or pieces dedicated to holding mounting bracket 219 in housing 205. Thus, it should be appreciated that housing 205 is sized and dimensioned to receive mounting bracket 219 in an internal cavity 213 as shown in FIG. 2D.

Flame element 201 has an aperture 209 and a hollow interior 207. Housing 205 has an arm 215 that can extend into hollow interior 207, such that a projection 217 of flame element 201 rests on a recessed area of arm 215 to suspend flame element 201 in housing 205. While this embodiment shows that arm 215 extends from housing 205, it is contemplated that arm 215 can extend from mounting bracket 219 to suspend flame element 201 within housing 205. Alternatively, it is contemplated that flame element 201 has a horizontally extended channel that receives arm 215, wherein the remainder of flame element 201 is solid. Once flame element 201 is suspended on arm 215, light may be emitted from light source 223 while flame element 201 moves to simulate a moving flame. It should be appreciated that tab 229 reduces the risk of flame element 201 falling or separating from arm 215 while flame element 201 is moving to simulate a real candle light.

An exemplary flame element 301 is shown in FIG. 3A. Flame element 301 has a flame-shaped portion 325 and a body portion 327. Flame-shaped portion 325 includes a concave surface defining a face in the shape of a flame. However, planar and other dimensional surfaces could alternatively be used. Typically, light is projected onto flame-shaped portion 325 while flame element 301 is moving with respect to the housing in order to simulate a real candle light. Body portion 327 has an aperture 309 and a tab 329 as shown in FIG. 3B.

Tab 329 can be defined by a sidewall 311 of flame element 301. Furthermore, tab 329 can define a portion of an aperture 309 of flame element 301. Typically, tab 329 is a flexible material, such that an arm of a housing can bend tab 329 in an amount sufficient to allow the arm to enter hollow interior 307 of flame element 301 and suspend flame element 301.

As discussed above, flame element 301 can have a projection 317. Projection 317 is typically disposed in hollow interior 307. While projection 317 is shown as a cone shape, it is contemplated that other shapes are suitable, such as a sphere, a cone with a flat top, a cylinder, a cube, a rectangle, a prism, and any other shape that is would allow flame element 301 to move in a manner that simulates a real candle light while suspended in a housing.

Flame element 301 is preferably predominantly white in color, though different colors are contemplated, as well as different transparencies. Though only the flame element is explicitly described as an example, color or transparency variations discussed herein can alternatively apply to only a portion of the flame element 301. Preferably, flame-shaped portion 325 can have various colors and transparencies, but body portion 327 may also be made to have different colors or transparencies. Ideally, the flame element 301 is colored such that light projected onto it is reflected so that it is visible to a human observer. Variations of the color white or other colors (e.g., red, orange, yellow, blue, and any combination thereof, including gradient changes from one color to another and/or color blends) can be used depending on the color of light that is to be reflected. Additionally, the flame element 301 can comprise different materials or finishes depending on the desired effect. A glossy finish may be desirable in some circumstances, while in others a matte finish may be desired. The finish of the flame element material can affect how light is reflected by the flame element 301, where matte finishes would reflect the light in more directions than a glossy finish.

The thickness of the material can also affect optical qualities. For example, the thickness flame-shaped portion 325 can affect the amount of light that is able to pass through flame-shaped portion 325 by diffusion. In addition, flame-shaped portion 325 can be made from one or more materials which have varying levels of transparency, ranging from completely transparent to completely opaque. For example, in some embodiments, flame-shaped portion 325 can allow more than 50% of incident light to pass through, while other embodiments can restrict light passage to 40% of incident light, 30% of incident light, 20% of incident light, 10% of incident light, or 0% of incident light (meaning the material is substantially opaque). Some embodiments can have different transparencies in different portions flame-shaped portion 325. For example, one embodiment might be more transparent near the top of flame-shaped portion 325 and have a gradient whereby transparency at each point moving toward body portion 327 is decreased. These effects are important for devices where light is projected onto one side of the flame element 301, but is also to be viewed on the opposite side as the light passes through.

Some embodiments of the flame element 301 can include light transmitting channels that allow light to be shined onto an area of the flame element 301 such that the light can then be seen from a different area of the flame element 301. For example, if light is shined onto body portion 327 it will then be visible from flame-shaped portion 325 of flame element 301 via the light channel. Alternatively to light channels, the flame element 301 can be made from composite materials having desirable optical qualities to produce a similar result (e.g., flame element 301 can have a core and an outer coating, where the core is made from a material that is substantially transparent such that light can pass through it and the outer coating made from a material that is substantially translucent such that light is more effectively transmitted throughout the entire flame element 301).

In some embodiments, flame element 301 comprises a second aperture 331 as shown in FIGS. 3C and 3D. Second aperture 331 can be disposed on the bottom of flame element 301. It is contemplated that a recess 324 is disposed near second aperture 331. A magnet can be inserted into recess 324 that cooperates with other components of an electronic lighting device to cause flame element to move in a manner that simulates a moving flame. Hollow interior 307 can extend between aperture 309 and second aperture 331. While flame element 301 has second aperture, it is contemplated that flame element 301 can have no apertures, a single aperture or a plurality of apertures. Flame element 301 further includes a channel 333 that is circumferentially disposed near the bottom of flame element 301. An O-ring can be placed within channel 333 to provide reduce the noise that occurs when flame element 301 contacts a sidewall of a housing when flame element 301 is moving to simulate a real candle light. It should be appreciated that a magnet can be disposed on the opening of second aperture 331 thereby covering second aperture 331.

FIG. 3D shows that flame element 301 can have an asymmetric shape in body portion. Specifically, it is contemplated that a base portion 373 of body portion 327 has an asymmetric shape, such that one side is larger than its opposite side. For example, as shown in FIG. 3D, base portion 373 extends further horizontally on the side opposite of aperture 309 than base portion 373 on the side of aperture 309. However, in alternative embodiments, body portion can be symmetrical.

Figure 4A:
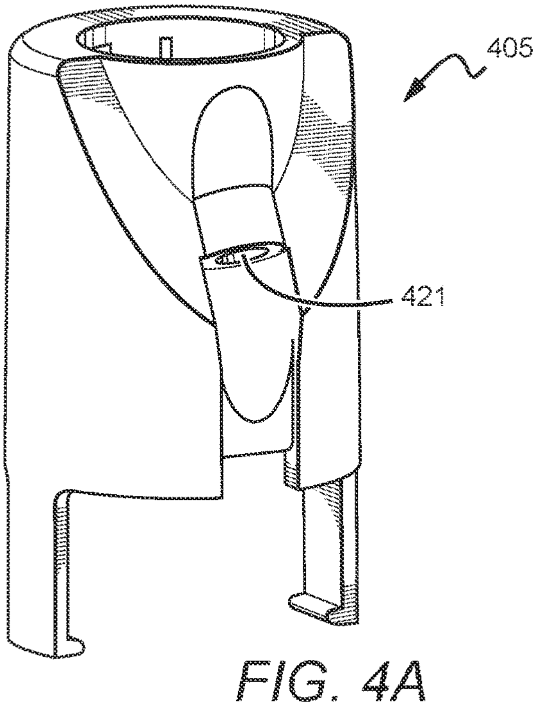
FIG. 4A is a front perspective view of an embodiment of a housing.
Figure 4B:
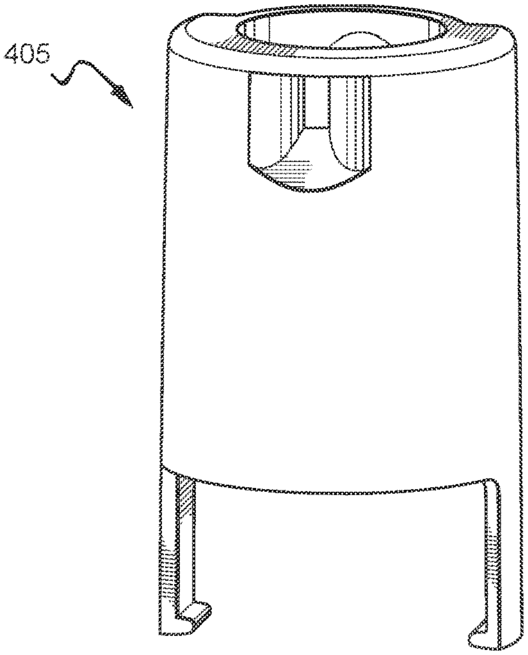
FIG. 4B is a back perspective view of the housing in FIG. 4A.
Figure 4C:
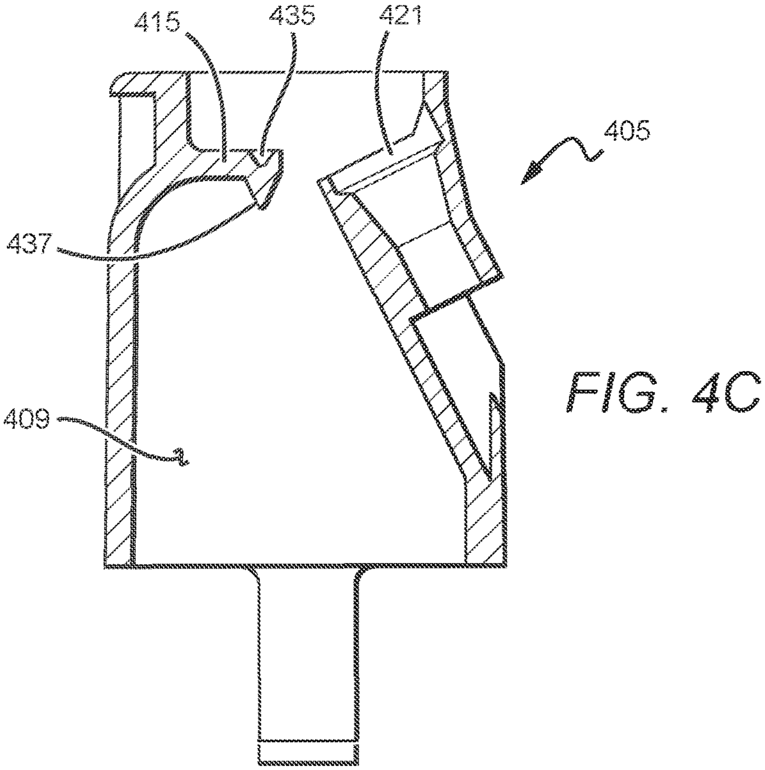
FIG. 4C is a cross-sectional view of the housing in FIG. 4A.

An exemplary housing 405 is shown in FIGS. 4A and 4B. Housing 405 can have a groove 421 where a light source can be housed. However, it is also contemplated that a mounting bracket has a groove for a light source and the housing is sized and dimensioned to receive the mounting bracket with the light source. FIG. 4C shows that housing 405 comprises an arm 415 having a recess 435 and a projection 437. While arm 415 is part of housing 405, it is contemplated that arm 415 can be a separate component from housing 405. In such embodiments, arm 415 can be removably coupled to housing 405 through a variety of coupling techniques as described above. Recess 435 is sized and dimensioned to receive a projection from a flame element so that a flame element, as shown previously in FIGS. 1D and 2D, can be suspended in housing 405. Furthermore, housing 405 has an internal cavity 409 that can receive at least one of a portion of a flame element and a mounting bracket.

Figure 5A:
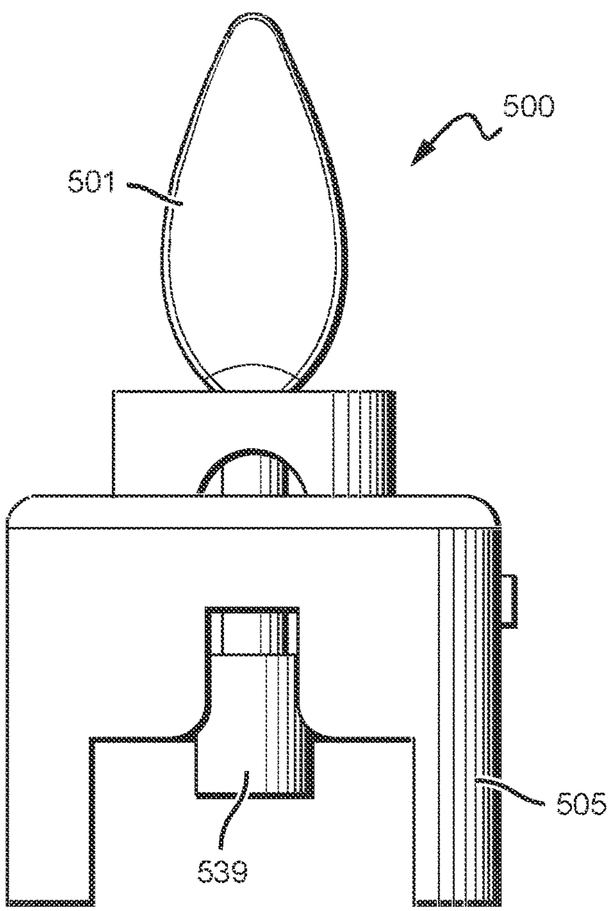
FIG. 5A is a front view of an embodiment of an electronic lighting device having a pin.
Figure 5B:
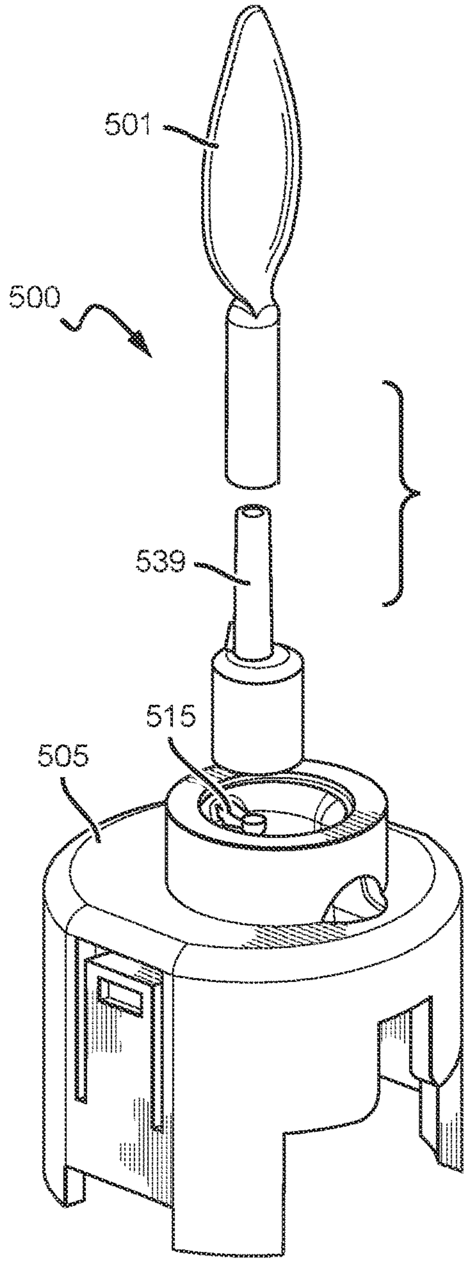
FIG. 5B is an exploded view of the electronic lighting device in FIG. 5A.
Figure 5C:
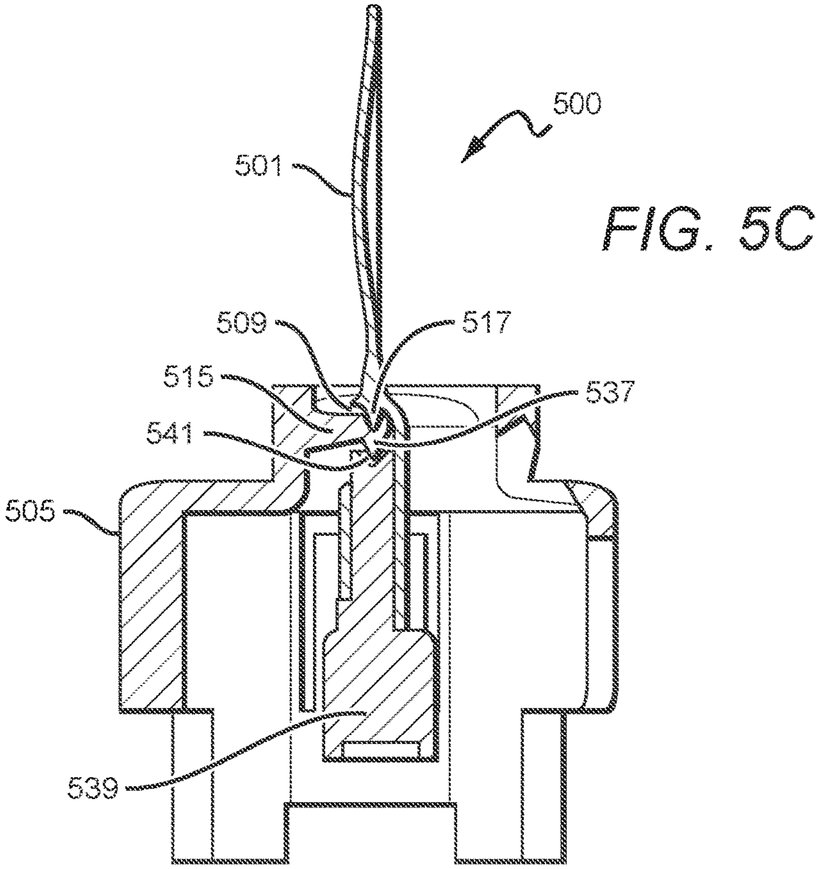
FIG. 5C is a cross-sectional view of the electronic lighting device in FIG. 5A.

It is contemplated that some embodiments can further include a pin to provide additional stability of the flame element on the arm of the housing. For example, FIGS. 5A and 5B show an electronic lighting device 500 having a flame element 501, a housing 505, and a pin 539. Pin 539 is sized and dimensioned to extend through a second aperture of flame element 501 and into the hollow interior of flame element 501 as shown in FIG. 5C. It is contemplated that arm 515 can be removably coupled to housing 505.

Figure 5D:
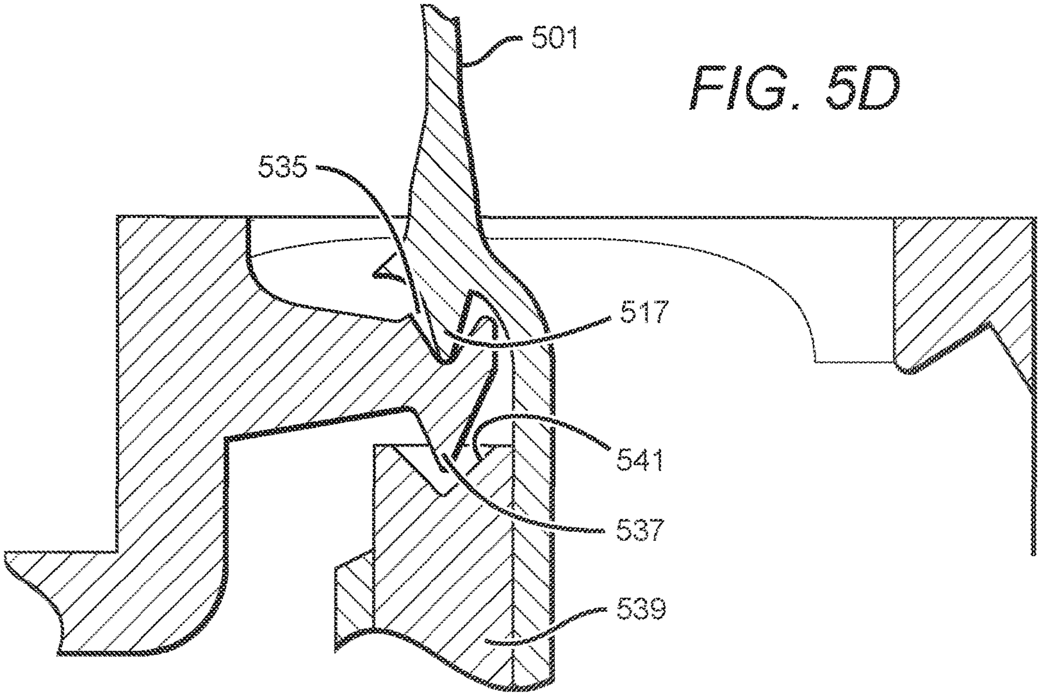
FIG. 5D is an enlarged view of a region of the cross-sectional view in FIG. 5C.

Arm 515 extends into flame element 501 and has a recess 535, as shown in FIG. 5D, which receives a projection 517 of flame element 501 that rests within recess 535 so as to allow movement of flame element 501 while projection 517 rests within recess 535. Arm 515 has a downward projection 537 that rests within a recess 541 of pin 539 to provide additional stability of flame element 501 and reduce the risk of flame element 501 from falling or separating from arm 515. It is contemplated that pin 539 has a first diameter and the hollow interior has a second diameter, wherein the first diameter and the second diameter are preferably within 10% of each other. Pin 539 can be inserted after flame element 501 is on arm 515 to secure flame element 501 on arm 515. While pin 539 can properly secure arm 515 without a tab as discussed above, it is contemplated that flame element 501 further comprises a tab.

Figure 6A:
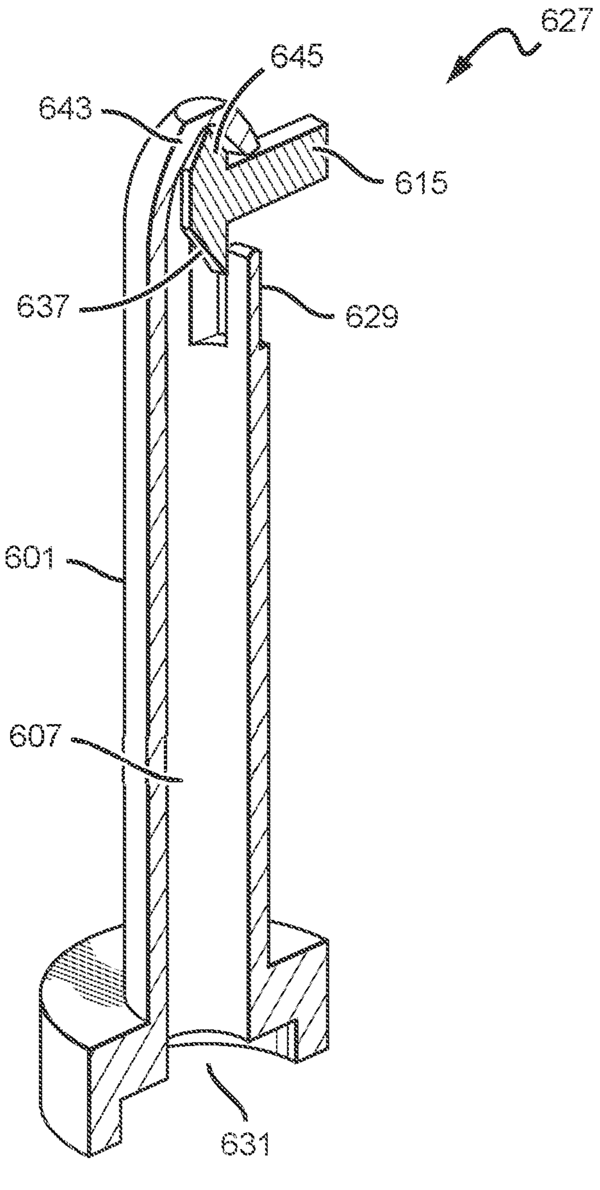
FIGS. 6A and 6B are cross-sectional views of an embodiment of a portion of a flame element showing a concave apex.
Figure 6B:
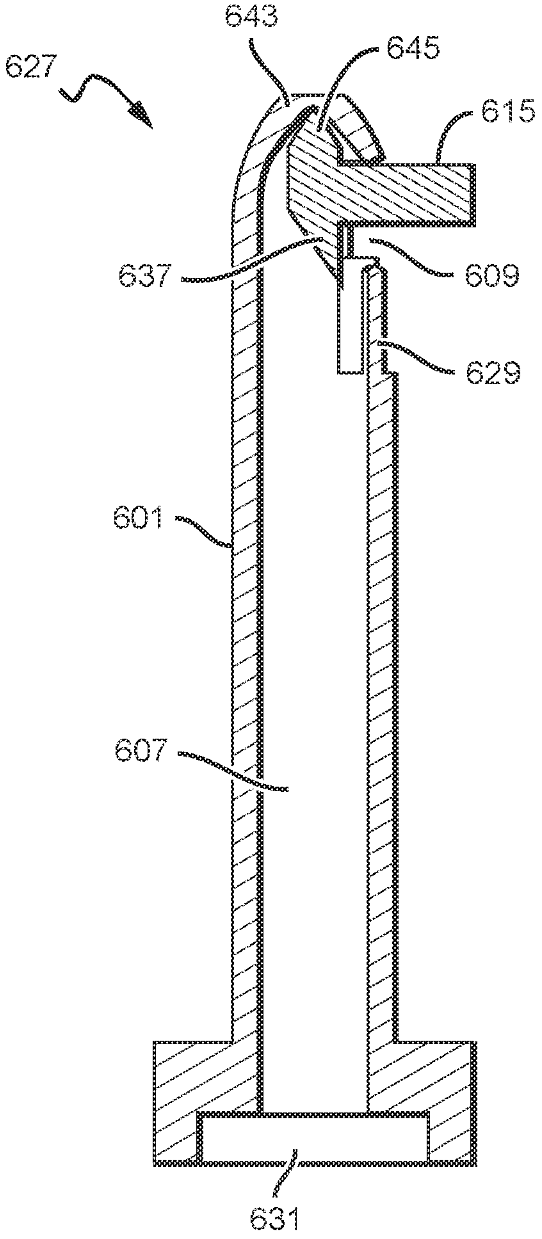

As discussed above, electronic lighting devices can have a flame element with a projection that extends into the hollow interior and the projection rests on an arm of the housing. However, it is contemplated that a flame element 601 has a body portion 627 with a convex apex 643 that defines an upper portion of hollow interior 607 as shown in FIGS. 6A and 6B. Similar to the embodiments described above, flame element 601 has a tab 629 and a second aperture 631. An arm 615 from a housing or mounting bracket extends within hollow interior 607 to suspend flame element. In this embodiment, arm 615 has an upward projection 645 and concave apex 643 rests on upward projection 645 so as to allow movement of flame element 601 while flame element 601 is suspended on arm 615.

It should be appreciated that tab 629 provides additional support for flame element 601 to remain on arm 615 while flame element 601 is moving to simulate a real candle light. As shown in FIGS. 6A-6B, flame element 601 has a tab 629 that is defined by the sidewall and forms part of aperture 609. Arm 615 comprises a downward projection 637 and tab 629 and downward projection 637 of arm 615 overlap to secure flame element 601 on arm 615 while concave apex 643 rests on upward projection 645. In contemplated embodiments, at least one of tab 129 and downward projection 137 bends to allow flame element 101 to be removed from or placed on arm 115.

While an arm can be used to suspend a flame element in a housing, it is contemplated that other suitable components can be used to suspend the flame element without sacrificing the ability to simulate a real candle light. For example, FIG. 7A shows an electronic lighting device 700 that comprises a flame element 701, a housing 705, a clip (e.g., a wire clip 747), and a mounting rod 749. It is contemplated that the clip is disposed on an exterior surface of the flame element, such that an aperture or through hole is not needed on flame element to suspend flame element in a housing.

Flame element 701 is at least partially disposed within housing 705 and wire clip 747 is disposed on flame element 701. Mounting rod 749 is sized and dimensioned to couple flame element 701 by engaging wire clip 747 so as to allow movement of flame element 701 with respect to housing 705 while flame element 701 is coupled to housing 705.

FIG. 7B shows an exploded view of electronic lighting device 700. As shown, electronic lighting device can further comprise a mounting bracket 719. It is contemplated that mounting rod 749 engages wire clip 747 and engages a slot 751 on mounting bracket 719. Mounting bracket 719 can be received by housing 705 so as to suspend flame element 701 in housing 705. Additionally, or alternatively, mounting bracket 719 can receive a light source 723 that is configured to emit light onto flame element 701. While FIG. 7B shows mounting bracket 719 configured to receive mounting rod 749, it is contemplated that that mounting rod 749 can directly couple housing 705 rather than mounting bracket 719.

Figure 7D:
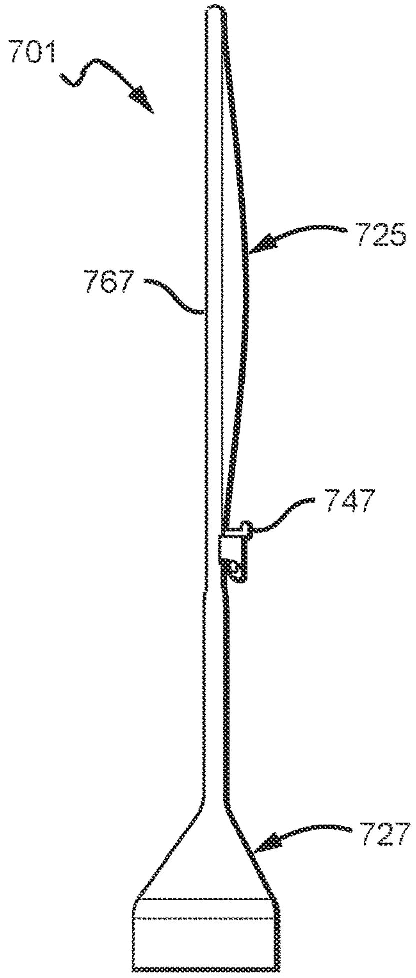
Figure 7E:
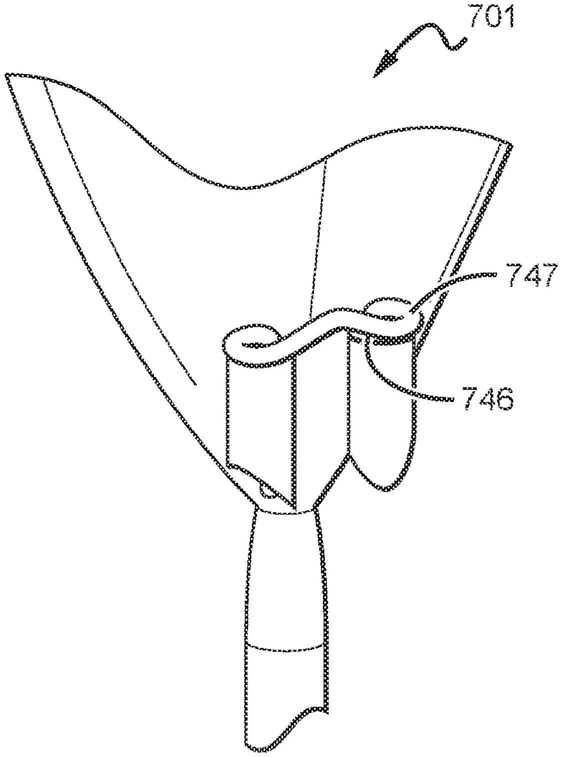
FIG. 7E is an enlarged view of the wire clip of FIG. 7A.

Flame element 701 has a flame-shaped portion 725 and a body portion 727 as shown in FIG. 7C. Wire clip 747 is disposed on flame-shaped portion 725 of flame element 701 at one end and the opposite end is adjacent to the flame-shaped portion. It is contemplated that a mounting rod is configured to engage flame element 701 via a friction fit provided between wire clip 747 and flame element 701. Additionally, or alternatively, wire clip 747 forms a through hole 746 and a mounting rod is configured to engage wire clip 747 via through hole 746. FIG. 7D shows a side view of flame element 701 having wire clip 747 disposed on flame-shaped portion 725 of flame element 701 on one end. It is contemplated that wire clip 747 is disposed on an opposite side of a face 767 of flame element 701. Typically, light is emitted onto face 767 to illuminate flame element 701 to simulate a real candle light. However, it is also contemplated that wire clip 747 can be disposed on face 767 of flame element 701.

Figure 8A:
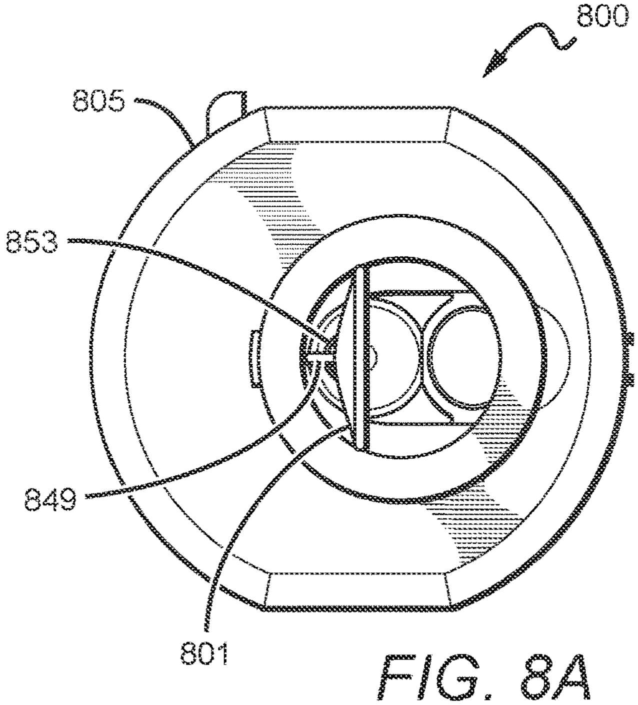
FIG. 8A is a top view of an embodiment of an electronic lighting device having a flame element with an arch.

While a wire clip can be used to suspend the flame element, it is contemplated that an electronic lighting device 800 comprises an arch 853 disposed on a flame element 801 as shown in FIG. 8A. A mounting rod 849 can be configured to couple arch 853 and a housing 805 to suspend flame element 801.

Figure 8B:
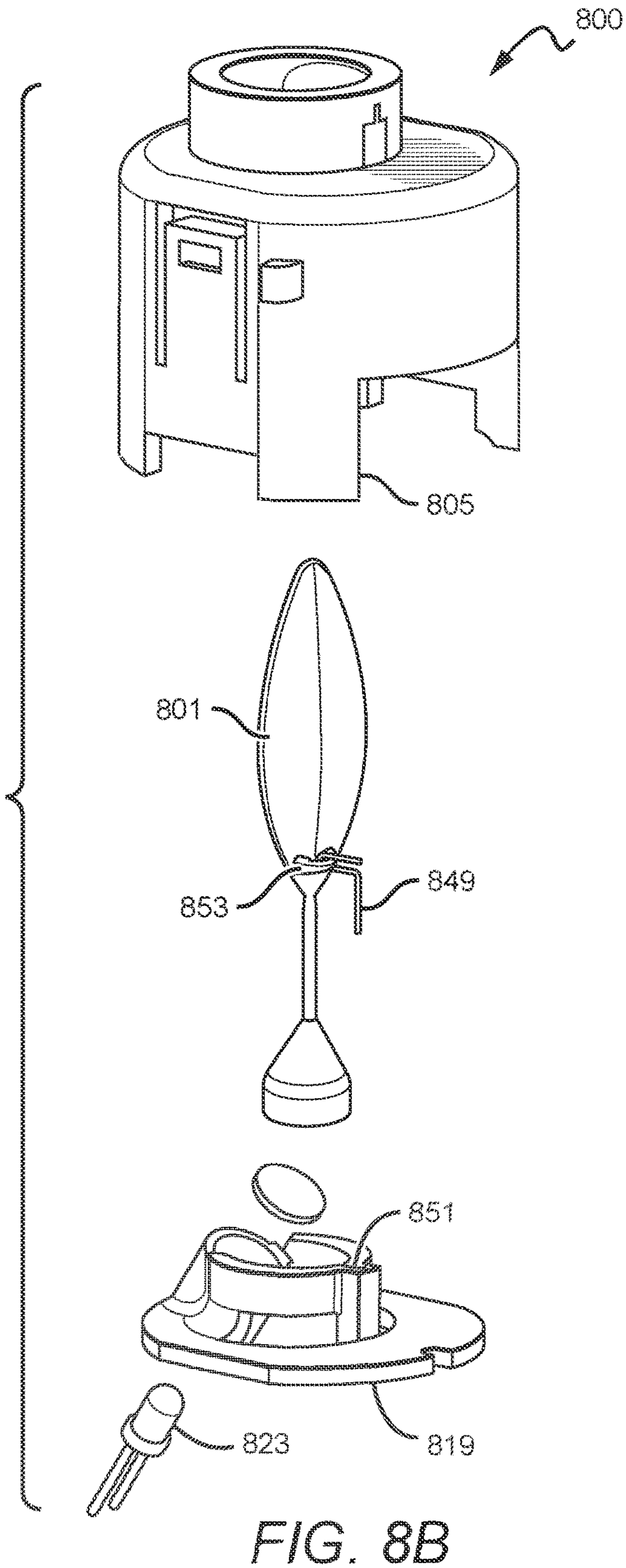
FIG. 8B is an exploded view of the electronic lighting device in FIG. 8A.

Electronic lighting device 800 further comprises a mounting bracket 819, which has a slot 851 and can receive a light source 823 as shown in FIG. 8B. Mounting rod 849 can engage arch 853 and mounting bracket 819 via slot 851. Thus, it should be appreciated that housing 805 can be sized and dimensioned to receive mounting bracket 819 to suspend flame element 801 in housing 805. Alternatively, mounting rod 849 can directly couple housing 805 to suspend flame element 801 in housing 805.

Figure 8C:
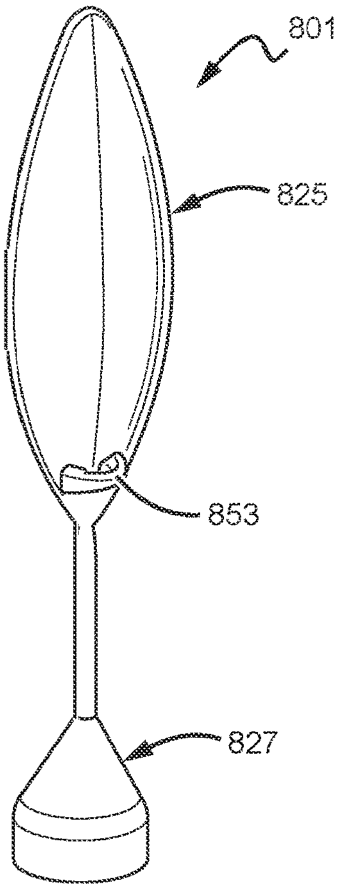
FIG. 8C is a perspective view of the flame element in the electronic lighting device in FIG. 8A.

FIG. 8C shows that arch 853 can be formed by a portion of flame element 801. However, it is contemplated that arch 853 is a separate component that is attached to flame element 801. Arch 853 can be disposed on flame-shaped portion 825, but it is also contemplated that arch 853 can be disposed on body portion 827. While arch 853 is shown in a horizontal configuration, arch 853 can be disposed in a vertical configuration.

Figure 9A:
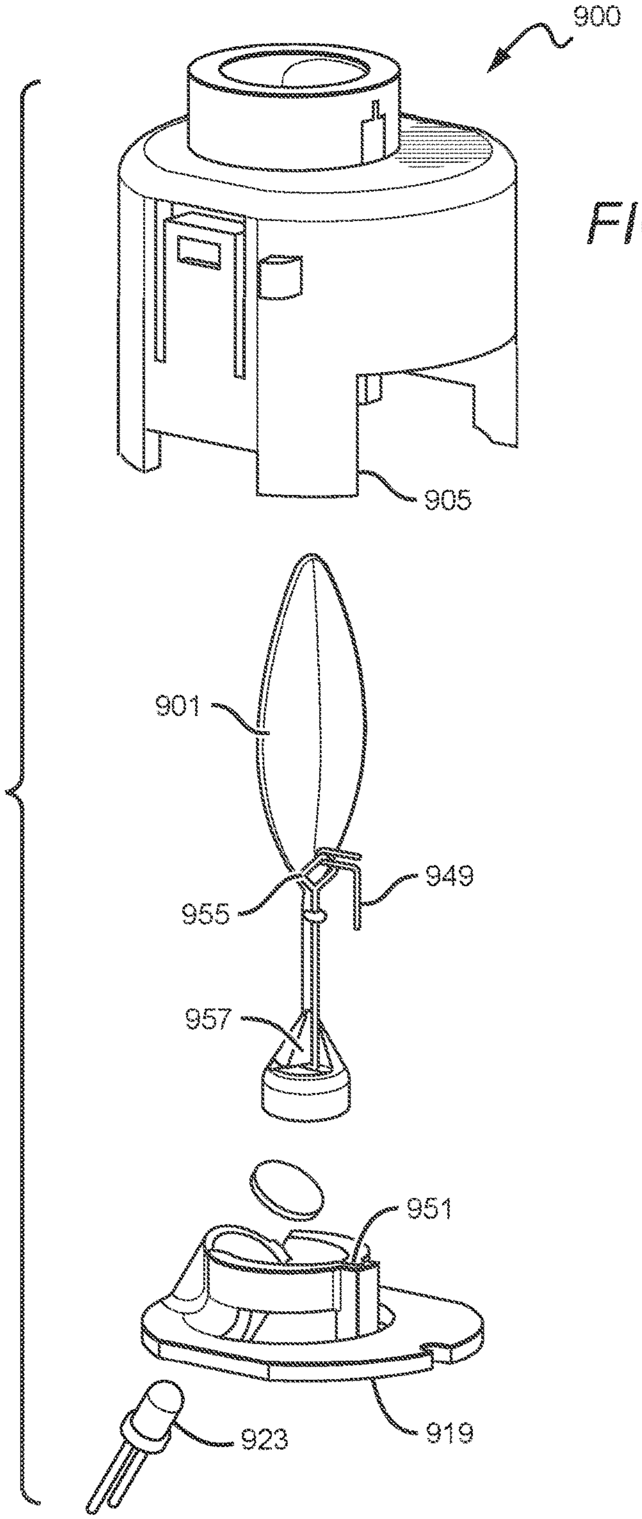
FIG. 9A is an exploded view of an embodiment of an electronic lighting device.

Another electronic lighting device having a flame element with a clip is illustrated in FIG. 9A. Electronic lighting device 900 has a housing 905, a flame element 901 and a mounting bracket 919. Electronic lighting device 900 comprises a clip 955 that extends into a notch 957 of flame element 901. Mounting rod 949 is configured to couple clip 955 and mounting rod 949 can be inserted into slot 951 of mounting bracket 919. It should be appreciated that mounting bracket 919 can receive a light source 923 to emit light onto flame element 901. Housing 905 is sized and dimensioned to receive mounting bracket 919, such that flame element 901 is suspended in housing 905.

FIG. 9B shows an enlarged view of mounting rod 949 coupled to mounting bracket 919 and clip 955. It is contemplated that clip 955 can slide into mounting rod 949 or that clip 955 and mounting rod 949 are manufactured in a coupled configuration. Mounting rod 949 can slide into slot 951 as better shown in FIG. 9C. Thus, flame element 901 can be suspended in housing 905 to simulate a moving flame.

Figure 9D:
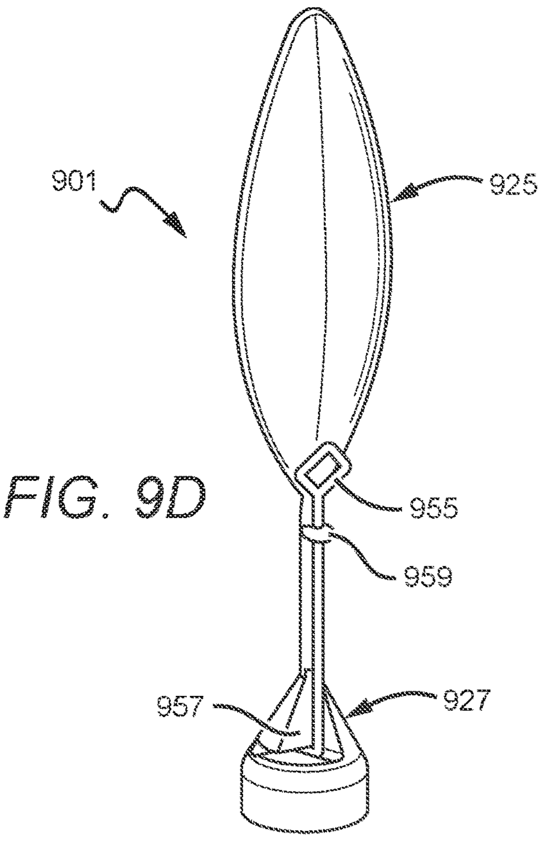
FIG. 9D is a perspective view of the flame element in the electronic lighting device in FIG. 9A.

FIG. 9D shows clip 955 disposed adjacent to a flame-shaped portion 925 of flame element 901 and extending into notch 957 in a body portion 927 of flame element 901. It is also contemplated that clip 955 is disposed on flame-shaped portion, such that notch 957 is not needed. Furthermore, an arch 959 can provide support to clip 955. As shown in FIG. 9D, clip 955 is a separate component from flame element

901. However, in other embodiments, clip can be formed by at least a portion of flame element 901.

It should be appreciated that the clips described above can be disposed on an exterior surface of the flame element. For example, the clip can be disposed on at least one of the flame-shaped portion and the body portion of the flame element. Thus, the clip supports the flame element, and eliminates the need for an aperture on the flame element and a support wire that extends through the aperture to support the flame element in the housing.

Figure 10A:
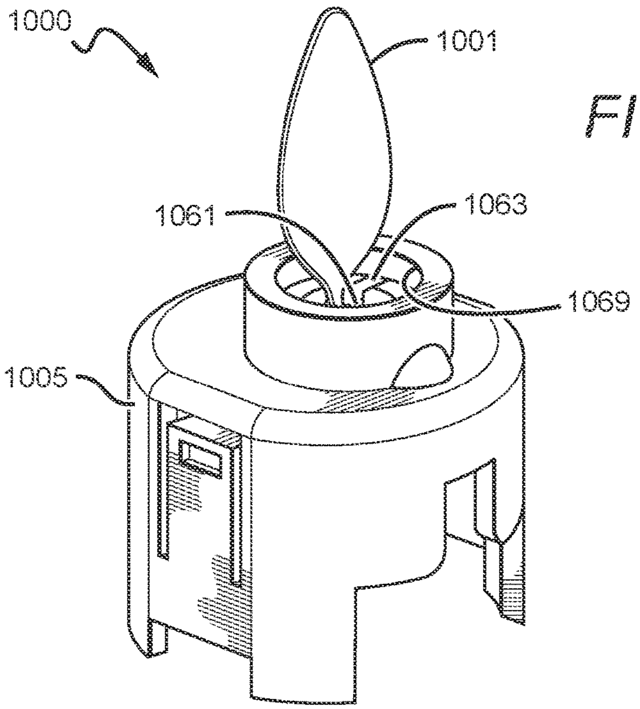
FIG. 10A is a perspective view of an embodiment of an electronic lighting device having a transverse support wire.

While clips as discussed above can be used to suspend a flame element to allow movement that simulates a real candle light, it is further contemplated that a support wire can also suspend a flame element. For example, FIG. 10A shows an electronic lighting device 1000 having a flame element 1001 and a housing 1005. Flame element 1001 at least partly extends above a top opening 1069 of housing 1005. It should be appreciated that a support wire 1061 extends below top opening 1069 to reduce the visibility of support wire 1061. In preferred embodiments, the support wire 1061 is at least 2 mm below the top opening 1069, though the depth of the wire can be different in different embodiments (e.g., 1 mm, 3 mm, 4 mm, 1-2 mm, 2-3 mm, or 3-4 mm).

Figure 10B:
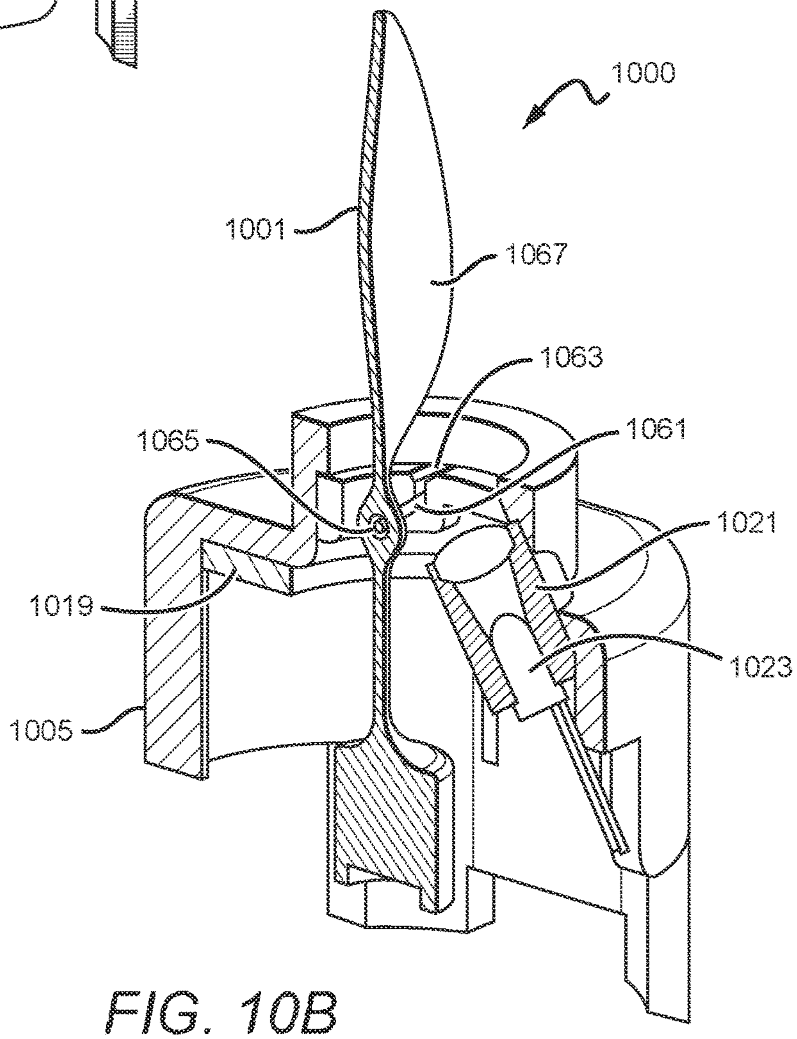
FIG. 10B is a cross-sectional view of the electronic lighting device in FIG. 10A.

FIG. 10B shows a mounting bracket 1019 that can be removably coupled with housing 1005. In other words, housing 1005 can be sized and dimensioned to receive mounting bracket 1019 in the internal cavity. Mounting bracket 1019 has a slit 1063 that is sized and dimensioned to receive support wire 1061. As shown in FIG. 10B, slit 1063 can extend vertically into mounting bracket 1019. Support wire 1061 extends from slit 1063 through an aperture 1065 of flame element 1001 in order to support flame element 1001. It should be appreciated that flame element 1001 is supported so as to allow movement of flame element 1001 to simulate a real candle light.

Support wire 1061 is preferably coupled to a mounting bracket 1019, although in some embodiments may be alternatively mounted to housing 1005. Additionally, support wire 1061 can be coupled to mounting bracket 1019 or housing 1005 in a number of ways. For example, in some embodiments the ends of the support wire 1061 can be fitted into grooves in mounting bracket 1019 or housing 1005. In other embodiments, the support wire 1061 can be glued to mounting bracket 1019 or housing 1005, while in still other embodiments it is fastened into place by a fastening technique (e.g., screw, adhesive, pressure fit, having the ends of the support wire fit within receiving holes, or even material deformation of the support wire 1061 to couple it to mounting bracket 1019 or housing 1005). It is contemplated that housing 1005 has a bottom surface that overlaps slit 1063 when housing 1005 receives mounting bracket 1019, such that support wire 1061 is at least partly secured in slit 1063 by housing 1005.

Mounting bracket 1019 can further include a light source 1023 that is configured to emit light onto flame element 1001. Light source 1023 can rest within a groove 1021 of mounting bracket 1019. However, it is also contemplated that housing 1005 can have a groove configured to receive light source 1023. Nonetheless, it should be appreciated that support wire 1061 is positioned in a manner (e.g., positioned below light emitted from light source 1023, positioned to extend perpendicular to light source 1023, etc.) that does not block light emitted from light source 1023. In other words, support wire 1061 does not cast a shadow on flame element 1001 from light emitted from light source 1023. In other words, support wire 1061 is most typically hidden behind a front of flame element 1001 define by a face 1067.

Figure 10C:
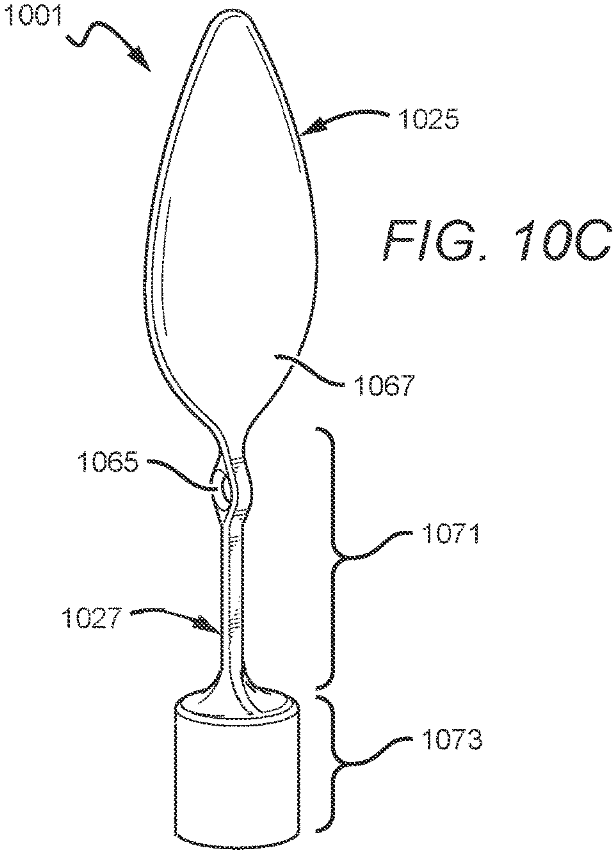
FIGS. 10C and 10D is a perspective view and side view, respectively, of the flame element of the electronic lighting device in FIG. 10A.

Flame element 1001 has a flame-shaped portion 1025 and a body portion 1027 as shown in FIG. 10C. Flame-shaped portion 1025 has face 1067, which is typically the major surface area of flame-shaped portion 1025. Aperture 1065 is disposed in body portion 127, and more specifically in an elongated portion 1071 of body portion 1027. However, it is contemplated that aperture 1065 can be disposed on base portion 1073 of body portion 1027 or on flame-shaped portion 1025. In contemplated embodiments, aperture 1065 extends through body portion 1027 in a direction parallel to face 1067. In other words, aperture 1065 extends in a line that is parallel to the plane of face 1067.

Figure 10D:
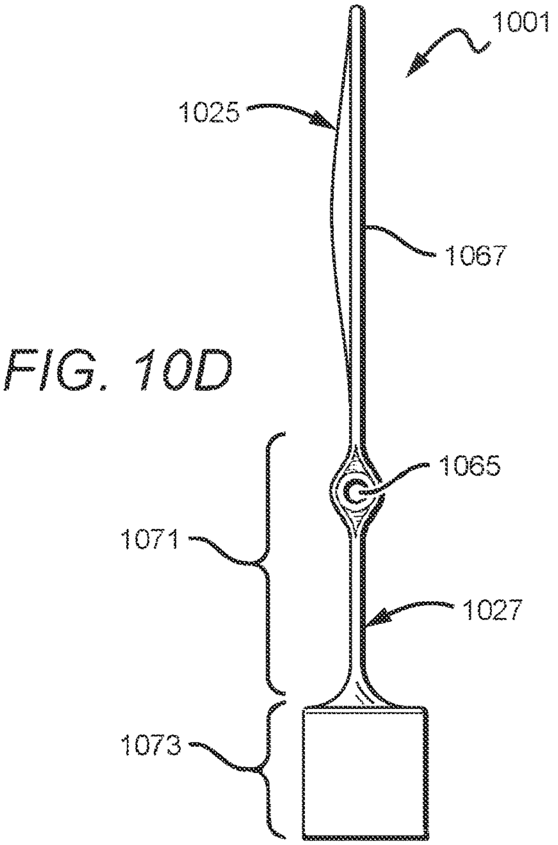

It is contemplated that flame element 1001 can have flame-shaped portion 1025 with a first weight and body portion 1027 with a second weight, such that the second weight is greater than the first weight. Typically, the center of mass of flame element 1001 is below aperture 1065, which ensures that flame element 1001 remains upright when it is supported in housing 1005. Additionally, or alternatively, body portion 1027 comprises elongated portion 1071 and base portion 1073, and elongated portion 1071 has a smaller cross-sectional are than base portion 1073. FIG. 10D shows that aperture 1065 can be a through hole disposed on body portion 1027.

Figure 11A:
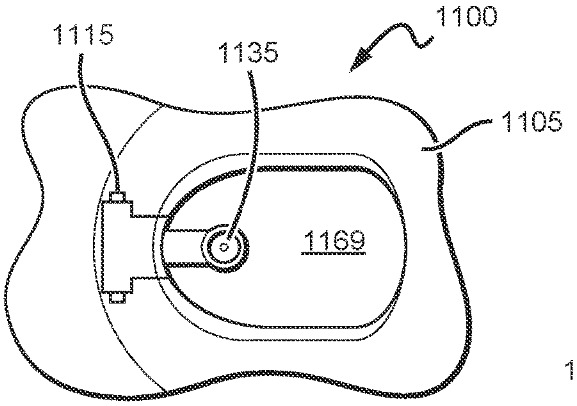
FIGS. 11A and 11B are top views of an embodiment of an electronic lighting device having a removable arm.
Figure 11B:
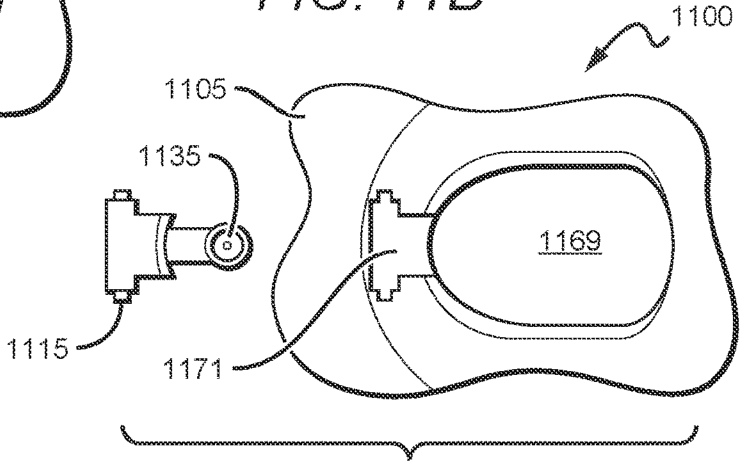

As discussed above, various different configurations are contemplated for electronic lighting devices. One of the various contemplated configurations comprises an electronic lighting device 1100 having an arm 1115 that is removably coupled to housing 1105 as shown in FIGS. 11A and 11B. In FIGS. 11A and 11B, arm 1115 can be slid into a recessed portion 1171 to couple arm 1115 to housing 1105. While a sliding configuration is disclosed, it should be appreciated that other contemplated coupling techniques include a snap-fit, pressure-fit, lock-fit, rotational lock-fitting, rotational snap-fitting, using fasteners such as screws, nuts, bolts, and/or washers.

FIG. 11A shows a top view of housing 1105 having arm 1115 coupled, which allows a user to couple a flame element to arm 1115 via top opening 1169. However, it is also contemplated that flame element can be coupled to arm 1115, and then arm 1115 with flame element can be subsequently coupled to housing 1105. FIG. 11B shows arm 1115 removed from housing 1105. Recessed portion 1171 can extend into housing to create a slot that fits a portion of arm 1115. It is contemplated that arm 1115 can be removed by sliding arm 1115 out of recessed portion 1171 in housing 1105. It should be noted that arm 1115 that is removably coupled to housing 1105 can be implemented in the other embodiments described above.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Thus, it should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. An electronic lighting device, comprising:

an elongated housing having an elongated shape;

an elongated element movably positioned within the elongated housing, the elongated element comprising at least a flame-shaped portion that is shaped to resemble a flame extending outside of the elongated housing, wherein the elongated element has multiple different transparency amounts such that an upper portion of the flame-shaped portion is more transparent than a lower portion of the flame-shaped portion;

a drive mechanism positioned below the elongated element configured to drive a movement of the elongated element to simulate a moving flame; and a light source configured to emit one or more colors of light onto the upper portion of the elongated element to simulate a color of a candle flame.

2. The electronic lighting device of claim 1, wherein the flame-shaped portion of the elongated element comprises one or more materials having varying levels of transparency.

3. The electronic lighting device of claim 1, wherein the elongated element has a varying thickness such that different amounts of the light emitted from the light source pass through different portions of the elongated element.

4. The electronic lighting device of claim 1, wherein the elongated element has an asymmetric shape.

5. The electronic lighting device of claim 1, wherein the drive mechanism comprises an electromagnet or a fan.

6. The electronic lighting device of claim 1, wherein the elongated housing comprises:

an elongated outer shell; and an opaque layer positioned within the elongated outer shell configured to surround an interior perimeter of the elongated outer shell to prevent the light from the light source from being seen through the elongated outer shell.

7. The electronic lighting device of claim 1, further comprising:

a lens positioned between the light source and the upper portion of the elongated element and within the elongated housing, wherein the lens is configured to focus the light emitted from the light source.

8. The electronic lighting device of claim 7, wherein a focal length of the lens is greater than a distance between the lens and the upper portion of the elongated element to provide soft lighting on the elongated element.

9. The electronic lighting device of claim 1, wherein the elongated housing comprises:

a mounting bracket that has a groove to position the light source.

* * * * *